(12) United States Patent
Shoemake et al.

(10) Patent No.: US 9,654,563 B2
(45) Date of Patent: May 16, 2017

(54) VIRTUAL REMOTE FUNCTIONALITY

(71) Applicant: Biscotti Inc., Plano, TX (US)

(72) Inventors: Matthew B. Shoemake, Allen, TX (US); Syed Nadeem Ahmed, Allen, TX (US)

(73) Assignee: Biscotti Inc., Allen, TX (US)

( * ) Notice: Subject to any disclaimer, the term of this patent is extended or adjusted under 35 U.S.C. 154(b) by 4 days.

(21) Appl. No.: 14/702,390

(22) Filed: May 1, 2015

(65) Prior Publication Data

US 2015/0244807 A1    Aug. 27, 2015

Related U.S. Application Data

(63) Continuation-in-part of application No. 14/539,106, filed on Nov. 12, 2014, which is a
(Continued)

(51) Int. Cl.
| | |
|---|---|
| *H04N 7/16* | (2011.01) |
| *H04L 29/08* | (2006.01) |
| *G06F 3/01* | (2006.01) |
| *H04N 21/422* | (2011.01) |
| *H04N 21/4223* | (2011.01) |
| *H04N 21/44* | (2011.01) |

(Continued)

(52) U.S. Cl.
CPC ............ *H04L 67/125* (2013.01); *G06F 3/017* (2013.01); *H04L 67/025* (2013.01); *H04L 67/1093* (2013.01); *H04L 67/141* (2013.01); *H04N 5/76* (2013.01); *H04N 21/4223* (2013.01); *H04N 21/42203* (2013.01); *H04N 21/43615* (2013.01); *H04N 21/44008* (2013.01); *H04N 21/44218* (2013.01); *H04N 21/4542* (2013.01); *H04N 21/4755* (2013.01)

(58) Field of Classification Search
CPC ......... H04N 21/42219; H04N 21/4222; H04N 21/42225; H04N 21/42226
See application file for complete search history.

(56) References Cited

U.S. PATENT DOCUMENTS

| | | |
|---|---|---|
| 5,641,288 A | 6/1997 | Zaenglein, Jr. |
| 5,966,167 A | 10/1999 | Nose et al. |

(Continued)

FOREIGN PATENT DOCUMENTS

| | | |
|---|---|---|
| EP | 1814290 A2 | 8/2007 |
| JP | 2010/152866 A | 7/2010 |

(Continued)

OTHER PUBLICATIONS

Amazon "Amazon CloudFront Documentation" 3 pages, Available at: http://aws.amazon.com/documentation/cloudfront/; Accessed on Feb. 25, 2014.

(Continued)

*Primary Examiner* — Gigi L Dubasky
(74) *Attorney, Agent, or Firm* — Swanson & Bratschun, L.L.C.

(57) ABSTRACT

Novel tools and techniques are described for providing remote control of consumer electronics devices, and, more particularly, to tools and techniques for providing virtual remote control of consumer electronics devices that do not have dedicated remote controllers.

35 Claims, 11 Drawing Sheets

Related U.S. Application Data continuation-in-part of application No. 14/106,263, filed on Nov. 13, 2013, now Pat. No. 9,253,520, and a continuation-in-part of application No. 14/170,499, filed on Jan. 31, 2014, now Pat. No. 9,300,910, and a continuation-in-part of application No. 14/341,009, filed on Jul. 25, 2014, and a continuation-in-part of application No. 14/472,133, filed on Aug. 28, 2014, now abandoned, and a continuation-in-part of application No. 14/479,169, filed on Sep. 5, 2014, now Pat. No. 9,485,459, and a continuation-in-part of application No. 14/106,279, filed on Dec. 13, 2013, now Pat. No. 9,310,977, and a continuation-in-part of application No. 14/106,360, filed on Dec. 13, 2013, now Pat. No. 8,914,837, and a continuation-in-part of application No. 14/464,435, filed on Aug. 20, 2014, now abandoned.

(60) Provisional application No. 61/987,304, filed on May 1, 2014, provisional application No. 61/737,506, filed on Dec. 14, 2012, provisional application No. 61/759,621, filed on Feb. 1, 2013, provisional application No. 61/858,518, filed on Jul. 25, 2013, provisional application No. 61/872,603, filed on Aug. 30, 2013, provisional application No. 61/874,903, filed on Sep. 6, 2013, provisional application No. 61/877,928, filed on Sep. 13, 2013.

(51) Int. Cl.
*H04N 21/442* (2011.01)
*H04N 21/454* (2011.01)
*H04N 21/475* (2011.01)
*H04N 21/436* (2011.01)
*H04N 5/76* (2006.01)

(56) References Cited

U.S. PATENT DOCUMENTS

| | | | |
|---|---|---|---|
| 6,058,307 A | 5/2000 | Garner | |
| 6,181,364 B1 | 1/2001 | Ford | |
| 6,307,526 B1 | 10/2001 | Mann | |
| 6,614,465 B2 | 9/2003 | Alexander et al. | |
| 6,717,607 B1 | 4/2004 | Lauper et al. | |
| 6,804,224 B1 | 10/2004 | Schuster et al. | |
| 7,039,393 B1 | 5/2006 | Kite | |
| 7,084,904 B2 | 8/2006 | Liu et al. | |
| 7,409,701 B1 | 8/2008 | Tiphane | |
| 7,460,150 B1 | 12/2008 | Coughlan et al. | |
| 7,646,404 B2 | 1/2010 | Liu et al. | |
| 8,122,491 B2 | 2/2012 | Yee et al. | |
| 8,144,182 B2 | 3/2012 | Shoemake et al. | |
| 8,239,903 B1 | 8/2012 | Campagna et al. | |
| 8,266,536 B2 | 9/2012 | Roberts et al. | |
| 8,300,082 B2 | 10/2012 | Malik | |
| 8,325,213 B2 | 12/2012 | Lamb et al. | |
| 8,330,795 B2 | 12/2012 | Iyer et al. | |
| 8,395,652 B1 | 3/2013 | Chapweske et al. | |
| 8,395,656 B1 | 3/2013 | Malzbender et al. | |
| 8,416,715 B2 | 4/2013 | Rosenfeld et al. | |
| 8,421,782 B2 | 4/2013 | Sakata et al. | |
| 8,566,838 B2 | 10/2013 | Sabin et al. | |
| 8,638,223 B2 | 1/2014 | Lahcanski et al. | |
| 8,736,660 B2 | 5/2014 | Rosenberg | |
| 8,879,801 B2 | 11/2014 | Ragland | |
| 8,914,837 B2 | 12/2014 | Ahmed et al. | |
| 8,933,886 B2 | 1/2015 | Imoto et al. | |
| 9,073,433 B2 * | 7/2015 | Seymour | B60K 35/00 |
| 9,219,840 B2 * | 12/2015 | Ashbrook | G06F 17/30265 |
| 9,253,520 B2 | 2/2016 | Shoemake et al. | |
| 9,300,910 B2 | 3/2016 | Shoemake et al. | |
| 9,310,977 B2 | 4/2016 | Ahmed et al. | |
| 9,323,325 B2 | 4/2016 | Perez et al. | |
| 9,329,682 B2 | 5/2016 | Keane et al. | |
| 9,485,459 B2 | 11/2016 | Shoemake et al. | |
| 2001/0001159 A1 | 5/2001 | Ford | |
| 2002/0059094 A1 | 5/2002 | Hosea et al. | |
| 2002/0073420 A1 | 6/2002 | Yoon | |
| 2002/0085843 A1 | 7/2002 | Mann | |
| 2002/0118675 A1 | 8/2002 | Strathmeyer et al. | |
| 2003/0160871 A1 | 8/2003 | Pelletier et al. | |
| 2003/0200105 A1 | 10/2003 | Borden, IV et al. | |
| 2004/0027624 A1 | 2/2004 | Parulski et al. | |
| 2004/0061787 A1 | 4/2004 | Liu et al. | |
| 2004/0114919 A1 | 6/2004 | Rife | |
| 2004/0145658 A1 | 7/2004 | Lev-Ran et al. | |
| 2004/0235466 A1 | 11/2004 | Kakemura | |
| 2005/0007445 A1 | 1/2005 | Foote et al. | |
| 2005/0066357 A1 | 3/2005 | Ryal | |
| 2005/0086069 A1 | 4/2005 | Watson et al. | |
| 2005/0096084 A1 | 5/2005 | Pohja et al. | |
| 2005/0108092 A1 | 5/2005 | Campbell et al. | |
| 2005/0195954 A1 | 9/2005 | Klein et al. | |
| 2005/0246738 A1 | 11/2005 | Lockett et al. | |
| 2005/0262542 A1 | 11/2005 | DeWeese et al. | |
| 2005/0283813 A1 | 12/2005 | Jamail et al. | |
| 2006/0031291 A1 | 2/2006 | Beckemeyer | |
| 2006/0107281 A1 | 5/2006 | Dunton | |
| 2006/0110136 A1 | 5/2006 | Abecassis | |
| 2006/0130118 A1 | 6/2006 | Damm | |
| 2006/0130119 A1 | 6/2006 | Candelore et al. | |
| 2006/0187306 A1 | 8/2006 | Matsui | |
| 2006/0209194 A1 | 9/2006 | Liu et al. | |
| 2006/0256133 A1 | 11/2006 | Rosenberg | |
| 2006/0268149 A1 | 11/2006 | Teng | |
| 2007/0050253 A1 | 3/2007 | Biggs et al. | |
| 2007/0067407 A1 | 3/2007 | Bettis et al. | |
| 2007/0161386 A1 | 7/2007 | Faber et al. | |
| 2007/0178891 A1 | 8/2007 | Louch et al. | |
| 2007/0188597 A1 | 8/2007 | Kenoyer | |
| 2007/0203708 A1 | 8/2007 | Polcyn et al. | |
| 2007/0204288 A1 | 8/2007 | Candelore | |
| 2007/0239825 A1 | 10/2007 | Walter | |
| 2007/0271580 A1 | 11/2007 | Tischer et al. | |
| 2008/0028318 A1 | 1/2008 | Shikuma | |
| 2008/0040380 A1 | 2/2008 | Miyaki | |
| 2008/0062253 A1 | 3/2008 | Jaspersohn et al. | |
| 2008/0152096 A1 | 6/2008 | Archer | |
| 2008/0189617 A1 | 8/2008 | Covell et al. | |
| 2008/0201369 A1 | 8/2008 | Cordoba | |
| 2008/0222673 A1 | 9/2008 | Durden et al. | |
| 2008/0240698 A1 | 10/2008 | Bartilson et al. | |
| 2008/0270589 A1 | 10/2008 | Hwang | |
| 2008/0292139 A1 | 11/2008 | Wadhwa et al. | |
| 2008/0307105 A1 | 12/2008 | Sethi et al. | |
| 2009/0015658 A1 | 1/2009 | Enstad et al. | |
| 2009/0034750 A1 | 2/2009 | Ayoub et al. | |
| 2009/0037945 A1 | 2/2009 | Greig et al. | |
| 2009/0232129 A1 | 9/2009 | Wong et al. | |
| 2009/0262206 A1 | 10/2009 | Park | |
| 2009/0281897 A1 | 11/2009 | Antos | |
| 2010/0053555 A1 | 3/2010 | Enriquez et al. | |
| 2010/0060477 A1 | 3/2010 | Laasik et al. | |
| 2010/0064334 A1 | 3/2010 | Blackburn et al. | |
| 2010/0080418 A1 | 4/2010 | Ito | |
| 2010/0131363 A1 | 5/2010 | Sievert et al. | |
| 2010/0157013 A1 | 6/2010 | Sylvain | |
| 2010/0169410 A1 | 7/2010 | Lund et al. | |
| 2010/0218170 A1 | 8/2010 | MacLellan et al. | |
| 2010/0220188 A1 | 9/2010 | Renkis | |
| 2010/0232758 A1 | 9/2010 | Cook et al. | |
| 2010/0266111 A1 | 10/2010 | Crausaz et al. | |
| 2010/0306379 A1 | 12/2010 | Ferris | |
| 2010/0315482 A1 | 12/2010 | Rosenfeld et al. | |
| 2011/0029370 A1 | 2/2011 | Roeding et al. | |
| 2011/0034242 A1 | 2/2011 | Aronzon et al. | |
| 2011/0063457 A1 | 3/2011 | Tokumitsu | |
| 2011/0069179 A1 | 3/2011 | Bathiche et al. | |
| 2011/0075011 A1 | 3/2011 | Abebe | |
| 2011/0153362 A1 | 6/2011 | Valin et al. | |
| 2011/0161163 A1 | 6/2011 | Carlson et al. | |

(56) References Cited

U.S. PATENT DOCUMENTS

| | | |
|---|---|---|
| 2011/0164044 A1 | 7/2011 | Huang |
| 2011/0185237 A1* | 7/2011 | Mahdi ................. H04L 12/5855 714/49 |
| 2011/0193971 A1 | 8/2011 | Lin |
| 2011/0205329 A1 | 8/2011 | Willis |
| 2011/0211678 A1 | 9/2011 | Woodworth et al. |
| 2011/0213664 A1 | 9/2011 | Osterhout et al. |
| 2011/0254914 A1 | 10/2011 | Ng |
| 2011/0267499 A1 | 11/2011 | Wan et al. |
| 2011/0317587 A1 | 12/2011 | Lida et al. |
| 2012/0002849 A1 | 1/2012 | Tokuse |
| 2012/0019609 A1 | 1/2012 | Chang et al. |
| 2012/0054809 A1 | 3/2012 | Chowdhury et al. |
| 2012/0072936 A1 | 3/2012 | Small et al. |
| 2012/0075168 A1 | 3/2012 | Osterhout et al. |
| 2012/0081501 A1 | 4/2012 | Benzaia et al. |
| 2012/0081502 A1 | 4/2012 | Naidu et al. |
| 2012/0086785 A1 | 4/2012 | Valin et al. |
| 2012/0102533 A1 | 4/2012 | Park |
| 2012/0120266 A1 | 5/2012 | Kang et al. |
| 2012/0123786 A1 | 5/2012 | Valin et al. |
| 2012/0134238 A1 | 5/2012 | Surprenant et al. |
| 2012/0154599 A1 | 6/2012 | Huang |
| 2012/0166517 A1 | 6/2012 | Lee et al. |
| 2012/0189282 A1 | 7/2012 | Wyatt et al. |
| 2012/0194553 A1 | 8/2012 | Osterhout et al. |
| 2012/0203823 A1 | 8/2012 | Manglik et al. |
| 2012/0206553 A1 | 8/2012 | MacDonald |
| 2012/0207088 A1 | 8/2012 | Liu et al. |
| 2012/0226752 A1 | 9/2012 | Jeong et al. |
| 2012/0229591 A1 | 9/2012 | Lee |
| 2012/0236107 A1 | 9/2012 | Rosenberg |
| 2012/0236127 A1 | 9/2012 | Ojala et al. |
| 2012/0266252 A1 | 10/2012 | Spiers et al. |
| 2012/0300061 A1 | 11/2012 | Osman et al. |
| 2012/0320147 A1 | 12/2012 | Kirby et al. |
| 2012/0331113 A1 | 12/2012 | Jain et al. |
| 2013/0007157 A1 | 1/2013 | Eftis et al. |
| 2013/0050432 A1 | 2/2013 | Perez et al. |
| 2013/0067508 A1* | 3/2013 | Janssen ................. G06F 21/31 725/30 |
| 2013/0083150 A1 | 4/2013 | Howarter et al. |
| 2013/0141518 A1 | 6/2013 | Chou |
| 2013/0174194 A1 | 7/2013 | Mooneyham |
| 2013/0183944 A1 | 7/2013 | Mozer et al. |
| 2013/0231183 A1 | 9/2013 | Zalewski |
| 2013/0265382 A1 | 10/2013 | Guleryuz et al. |
| 2013/0344961 A1 | 12/2013 | Iannetta |
| 2014/0041513 A1 | 2/2014 | Abesser et al. |
| 2014/0049593 A1 | 2/2014 | Pai et al. |
| 2014/0123162 A1 | 5/2014 | Karlsson et al. |
| 2014/0133658 A1 | 5/2014 | Mentz et al. |
| 2014/0168056 A1 | 6/2014 | Swaminathan et al. |
| 2014/0168071 A1 | 6/2014 | Ahmed et al. |
| 2014/0168344 A1 | 6/2014 | Shoemake et al. |
| 2014/0168453 A1 | 6/2014 | Shoemake et al. |
| 2014/0185828 A1 | 7/2014 | Helbling |
| 2014/0195428 A1 | 7/2014 | Ghetler |
| 2014/0208340 A1 | 7/2014 | Poornachandran et al. |
| 2014/0247321 A1 | 9/2014 | Rosenberg |
| 2014/0282744 A1* | 9/2014 | Hardy ................. H04N 21/482 725/61 |
| 2014/0333713 A1 | 11/2014 | Shoemake et al. |
| 2014/0359647 A1 | 12/2014 | Shoemake et al. |
| 2014/0362170 A1 | 12/2014 | Walker |
| 2014/0375752 A1 | 12/2014 | Shoemake et al. |
| 2015/0026708 A1 | 1/2015 | Ahmed et al. |
| 2015/0070516 A1 | 3/2015 | Shoemake et al. |
| 2015/0085056 A1 | 3/2015 | Van Broeck |
| 2015/0138303 A1 | 5/2015 | White |
| 2015/0237439 A1* | 8/2015 | Koss ................. H04R 1/1091 381/74 |
| 2015/0243163 A1 | 8/2015 | Shoemake |
| 2015/0324076 A1 | 11/2015 | Ahmed et al. |
| 2015/0334344 A1 | 11/2015 | Shoemake et al. |
| 2016/0081104 A1 | 3/2016 | Wu et al. |

FOREIGN PATENT DOCUMENTS

| | | |
|---|---|---|
| KR | 2010/0062559 A | 6/2010 |
| KR | 2012/0139251 A | 12/2012 |
| WO | WO 2010/118202 A1 | 10/2010 |
| WO | WO 2010/147281 A1 | 12/2010 |
| WO | WO 2012/076724 A1 | 6/2012 |
| WO | WO 2014/093931 A1 | 6/2014 |
| WO | WO 2014/093932 A1 | 6/2014 |
| WO | WO 2014/093933 A1 | 6/2014 |
| WO | WO 2014/121148 A1 | 8/2014 |
| WO | WO 2015/013592 A1 | 1/2015 |
| WO | WO 2015/031671 A1 | 3/2015 |
| WO | WO 2015/035247 A1 | 3/2015 |

OTHER PUBLICATIONS

Amazon "Amazon Simple Storage Service Getting Started Guide" Mar. 1, 2006, 20 pages, Amazon Web Services LLC.

Anderson "SETI@home: An Experiment in Public-Resource Computing" (Nov. 2002) 8 pages, Space Sciences Laboratory, U.C. Berkeley.

Apple "Apple TV 3rd Generation Setup Guide" 36 pages.

Apple "iPhoto for Mac" 6 pages, Available at: https://www.apple.com/mac/iphoto/; Accessed on Feb. 28, 2014.

Apple "OS X Mavericks, Mac App Store" 5 pages, Available at: http://www.apple.com/osx/apps/app-store.html; Accessed on Feb. 28, 2014.

Apple, "iOS 8 FaceTime" video calling service; Available at: http://www.apple.com/ios/facetime/; Accessed on Oct. 2, 2014; 3 pages.

AWS, Amazon Elastic Compute Cloud (EC2), Amazon Web Services LLC, 6 pages, Available at: http://aws.amazon.com/ec2/; Accessed on Mar. 3, 2014.

AWS, Amazon Simple Storage Service, Amazon Web Services, Inc., 6 pages, Available at: http://aws.amazon.com/s3/; Accessed on Mar. 3, 2014.

Biscotti camera products; Available at: http://biscotti.com/biscotti; Accessed on Oct. 2, 2014; 1 page.

Blue Host, "The Best Web Hosting", Available at: http://www.bluehost.com/; Accessed on Oct. 2, 2014; 3 pages.

BlueJeans Network; Multi-Party Conferencing in the Cloud; Available at: http://www.bluejeans.com; Accessed on Oct. 2, 2014; 3 pages.

Cerf et al. (1974) "Specification of Internet Transmission Control Program" Network Working Group; 70 pages.

Cisco Collaboration Endpoints; Video calling cameras and systems; Available at: http://www.cisco.com/c/en/us/products/collaboration-endpoints/product-listing.html; Accessed on Oct. 2, 2014; 2 pages.

Data Center Virtualization and Cloud Infrastructure Products; Available at: http://www.vmware.com/products/datacenter-virtualization/; Accessed on Feb. 25, 2014; 5 pages.

Dect "Part 6: Identities and addressing" (Feb. 1998) European Standard (Telecommunications series); 41 pages.

Domain Discover.US "Put Yourself on the Web"; Available at: https://www.tierra.net/domains; 3 pages.

Dropbox Review and Rating, Available at: http://www.pcmag.com/article2/0,2817,2343852,00.asp, Accessed on Feb. 25, 2014, 12 pages.

Fielding et al. (1999) "Hypertext Transfer Protocol—HTTP/1.1" Network Working Group; 114 pages.

Google "Google Apps for Business" 2 pages, Available at: http://www.google.com/enterprise/apps/business/, Accessed on Feb. 28, 2014.

Google "Google Play" 3 pages, Available at: https://play.google.com/store?hl=en, Accessed on Feb. 28, 2014.

Google "How Set Up Google Chromecast?" Available at googlechromecast.com/how-set-up-google-chromecast/, retrieved on Apr. 29, 2014, 25 pages.

(56) References Cited

OTHER PUBLICATIONS

Google "What is Google Chromecast?" Available at googlechromecast.com/what-is-google-chromecast/ retrieved on Apr. 29, 2014, 6 pages.
Google website; Available at: https://www.google.com/; Accessed on Oct. 2, 2014; 1 page.
HD Wi-Fi video monitoring cameras for iPhone, Android or computer; Dropcam, Inc., Available at: http://web.archive.org/web/20121213184724/https://www.dropcam.com/; Accessed on Feb. 28, 2014, 3 pages.
Information Sciences Institute (1981) "Internet Protocol"; Available at: http://www.ietf.org/rfc/rfc791.txt; Accessed on Oct. 2, 2014; 48 pages.
International Telecommunication Union; E.164: The international public telecommunication numbering plan; Available at: http://www.itu.int/rec/T-REC-E.164/en; Accessed on Oct. 2, 2014; 1 page.
International Telecommunication Union; G.711: Pulse code modulation (PCM) of voice frequencies; Available at: http://www.itu.int/rec/T-REC-G.711; Accessed on Oct. 2, 2014; 1 page.
International Telecommunication Union; G.722: 7kHz audio-coding within 64 kbit/s; Available at: http://www.itu.int/rec/T-REC-G.722; Accessed on Oct. 2, 2014; 1 page.
IP Version 6 Working Group (ipv6); Available at: http://datatracker.ietf.org/wg/ipv6/charter/; Accessed on Oct. 2, 2014; 3 pages.
ITU-T (2007) "H.264 Series H: Audiovisual and Multimedia Systems"; 564 pages.
Johnny Chung Lee Projects—Wii www.johnnylee.net/projects/wii/ Accessed on Sep. 5, 2013, 3 pages.
Lifesize; Video Conference Systems and Accessories; Available at: http://www.lifesize.com/en/products/video-conferencing-systems-and-accessories; Accessed on Oct. 2, 2014; 11 pages.
Linux Foundation, "Why the Xen Project?", Available at: http://www.xenproject.org/users/why-the-xen-project.html, Accessed on Feb. 25, 2014, 5 pages.
Logitech Business Webcams; Available at: http://www.logitech.com/en-us/for-business/products/webcams; Accessed on Oct. 2, 2014; 4 pages.
Ludwig, XEP-0166: Jingle; Available at: http://xmpp.org/extensions/xep-0166.html; Accessed on Oct. 2, 2014; 49 pages.
Mahy et al. (2010) Traversal Using Relays around NAT (TURN): Relay Extensions to Session Traversal Utilities for NAT (STUN); Available at: http://tools.ietf.org/html/rfc5766; Accessed on Oct. 2, 2014; 134 pages.
Microsoft, Xbox Games and Entertainment on All Your Devices; Available at: http://www.xbox.com/en-US/#fbid=_oRvaiAGfk1; Accessed on Oct. 2, 2014; 2 pages.
Nest, Learning Thermostat™ User Guide, 8 pages.
Netflix "Watch TV Shows Online, Watch Movies Online"; Available at: https://www.netflix.com/?locale=en-US; Accessed on Feb. 28, 2014; 1 page.
Nielson People Meters; Available at: http://www.nielsen.com/content/corporate/us/en/solutions/measurement/television.html; Accessed on Oct. 2, 2014; 4 pages.
Notification Concerning Transmittal of International Preliminary Report on Patentability by the International Bureau of WIPO for PCT International Application No. PCT/US13/75184; mailed Jun. 25, 2015; 11 pages.
Notification Concerning Transmittal of International Preliminary Report on Patentability by the International Bureau of WIPO for PCT International Application No. PCT/US13/75185; mailed Jun. 25, 2015; 9 pages.
Notification Concerning Transmittal of International Preliminary Report on Patentability by the International Bureau of WIPO for PCT International Application No. PCT/US13/75186; mailed Jun. 25, 2015; 8 pages.
Notification of Transmittal of the International Search Report and the Written Opinion of the International Searching Authority, or the Declaration for PCT International Application No. PCT/US13/75184; mailed May 13, 2014; 15 pages.
Notification of Transmittal of the International Search Report and the Written Opinion of the International Searching Authority, or the Declaration for PCT International Application No. PCT/US13/75185; mailed Apr. 7, 2014; 12 pages.
Notification of Transmittal of the International Search Report and the Written Opinion of the International Searching Authority, or the Declaration for PCT International Application No. PCT/US13/75186; mailed May 1, 2014; 11 pages.
Notification of Transmittal of the International Search Report and the Written Opinion of the International Searching Authority, or the Declaration for PCT International Application No. PCT/US14/14321; mailed May 9, 2014; 18 pages.
Notification of Transmittal of the International Search Report and the Written Opinion of the International Searching Authority, or the Declaration for PCT International Application No. PCT/US14/48158; mailed Nov. 10, 2014; 12 pages.
Notification of Transmittal of the International Search Report and the Written Opinion of the International Searching Authority, or the Declaration for PCT International Application No. PCT/US14/53254; mailed Dec. 15, 2014; 11 pages.
Notification of Transmittal of the International Search Report and the Written Opinion of the International Searching Authority, or the Declaration for PCT International Application No. PCT/US14/54409; mailed Dec. 16, 2014; 16 pages.
Nygren, The Akamai Network: A Platform for High-Performance Internet Applications, Akamai Technologies, Cambridge, US, 18 pages.
Oracle VM VirtualBox, 2 pages, Available at: https://www.virtualbox.org/, Accessed on Feb. 25, 2014.
Panasonic (2011) Operating Instructions: KX-TG9471 and KX-TG9472; 64 pages.
Pantos et al. (2013) "HTTP Live Streaming"; Available at: http://tools.ietf.org/html/draft-pantos-http-live-streaming-11; Accessed on Oct. 2, 2014; 74 pages.
Polycom; Polycom HDX Series Product Brochure; Available at: http://www.polycom.com/content/dam/polycom/common/documents/brochures/hdx-family-br-enus.pdf; Accessed on Oct. 2, 2014; 4 pages.
Postel (1982) "Simple Mail Transfer Protocol" Info Sciences Institute, USC; 71 pages.
Qemu, Open Source Processor Emulator, 2 pages, Available at: http://wiki.qemu.org/Main_Page, Accessed on Mar. 4, 2014.
Roku, User Guide (2008-2009), 51 pages,Roku, Inc.
Rosenberg "SIMPLE Made Simple: An Overview of the IETF Specifications for Instant Messaging and Presence Using the Session Initiation Protocol (SIP)" (Apr. 2013) Available at: https://tools.ietf.org/html/rfc6914, Accessed on Feb. 28, 2014.
Rosenberg (2010) "Interactive Connectivity Establishment (ICE): A Protocol for Network Address Translator (NAT) Traversal for Offer/Answer Protocols"; Available at: http://tools.ietf.org/html/rfc5245; Accessed on Oct. 12, 2014; 234 pages.
Rosenberg et al. "Session Traversal Utilities for NAT (STUN)"; Available at: http://tools.ietf.org/html/rfc5389; Accessed on Oct. 12, 2014; 102 pages.
Rosenberg, et al. (2002) "SIP: Session Initiation Protocol" http://www.ietf.org/rfc/rfc3261.txt; Accessed on Jun. 27, 2014; 265 pages.
Saint-Andre, "Extensible Messaging and Presence Protocol (XMPP): Core, Jabber Software Foundation" (Oct. 2004) 73 pages, Available at: http://xmpp.org/rfcs/rfc3920.html, Accessed on Feb. 28, 2014.
Skype video calling service; Available at: www.skype.com/en/; Accessed on Oct. 2, 2014; 4 pages.
Softlayer Services®, 2 pages, Available at: http://www.softlayer.com/services/storagelayer, Accessed on Mar. 4, 2014.
Speex: A Free Codec for Free Speech; Available at: http://www.speex.org; Accessed on Oct. 12, 2014; 2 pages.
U.S. Appl. No. 14/106,263; Final Office Action dated Jun. 13, 2014; 21 pages.
U.S. Appl. No. 14/106,263; NonFinal Office Action dated Mar. 6, 2014; 20 pages.
U.S. Appl. No. 14/106,263; NonFinal Office Action dated Mar. 24, 2015; 48 pages.

(56) References Cited

OTHER PUBLICATIONS

U.S. Appl. No. 14/106,279; Final Office Action dated Jul. 22, 2014; 17 pages.
U.S. Appl. No. 14/106,279; NonFinal Office Action dated Feb. 28, 2014; 16 pages.
U.S. Appl. No. 14/106,279; NonFinal Office Action dated Mar. 20, 2015; 30 pages.
U.S. Appl. No. 14/106,360; NonFinal Office Action dated Mar. 20, 2014; 22 pages.
U.S. Appl. No. 14/106,360; Notice of Allowance dated Oct. 29, 2014; 22 pages.
U.S. Appl. No. 14/170,499, NonFinal Office Action dated Jul. 18, 2014; 19 pages.
U.S. Appl. No. 14/170,499; NonFinal Office Action dated Feb. 9, 2015; 39 pages.
U.S. Appl. No. 14/170,499; NonFinal Office Action dated Jun. 3, 2015; 31 pages.
U.S. Appl. No. 14/341,009; NonFinal Office Action dated Apr. 22, 2015; 39 pages.
U.S. Appl. No. 14/464,435; NonFinal Office Action dated Feb. 12, 2015; 33 pages.
U.S. Appl. No. 14/472,133; NonFinal Office Action dated Feb. 11, 2015; 34 pages.
Varia et al., Overview of Amazon Web Services (Jan. 2014), 22 pages, Amazon Web Services.
Variable Frame Rate MP4; https://kb.speeddemosarchive.com/Variable_Frame_Rate_MP4; Accessed on Jun. 27, 2014; 3 pages.
Vidyo, "The Vidyo Experience"; Available at: http://www.vidyo.com/products/use/; Accessed on Oct. 2, 2014; 5 pages.
WebRTC; Available at: http://www.webrtc.org; Accessed on Oct. 2, 2014; 4 pages.
WebSocket.org, Are you plugged in?; "What is WebSocket?"; Available at: http://www.websocket.org; Accessed on Oct. 2, 2014; Kaazing Corporation; 1 page.
Wikipedia, the free encyclopedia "SIMPLE" en.wikipedia.org/wiki/SIMPLE; Retrieved Mar. 3, 2014, 3 pages.
Wikipedia, the free encyclopedia, "PlayStation 4" Available at: http://en.wikipedia.org/wiki/PlayStation_4, Accessed on Feb. 25, 2014, 21 pages.
Wikipedia, the free encyclopedia, Apache HTTP Server, 5 pages, Available at: http://en.wikipedia.org/wiki/Apache_HTTP_Server, Accessed on Feb. 26, 2014.
Wikipedia, the free encyclopedia; "Audio to Video Synchronization" Available at: http://en.wikipedia.org/wiki/Audio_to_video_synchronization; Accessed on Jun. 27, 2014; 6 pages.
Wikipedia, the free encyclopedia; "Bluetooth" Available at: en.wikipedia.org/wiki/Bluetooth; Retrieved on Apr. 29, 2014; 25 pages.
Wikipedia, the free encyclopedia; "Cloud computing" Available at: en.wikipedia.org/wiki/Cloud_computing; Retrieved Mar. 3, 2014; 34 pages.
Wikipedia, the free encyclopedia; "Cloud storage" Available at: en.wikipedia.org/wiki/Cloud-storage; Retrieved Mar. 3, 2014; 5 pages.
Wikipedia, the free encyclopedia; "cPanel" Available at: http://en.wikipedia.org/wiki/Cpanel; Accessed on Feb. 26, 2014; 4 pages.
Wikipedia, the free encyclopedia; "Distributed computing" Available at: http://en.wikipedia.org/wiki/Distributed_computing; Accessed on Feb. 26, 2014; 12 pages.
Wikipedia, the free encyclopedia; "Email" Available at: en.wikipedia.org/wiki/Email; Retrieved Mar. 3, 2014; 25 pages.
Wikipedia, the free encyclopedia; "Face Detection" Available at: http://en.wikipedia.org/wiki/Face_detection; Accessed on Feb. 28, 2014; 2 pages.
Wikipedia, the free encyclopedia; "Face Recognition System" Available at: http://en.wikipedia.org/wiki/Facial_recognition_system; Accessed on Feb. 28, 2014; 10 pages.
Wikipedia, the free encyclopedia; "Grid computing" Available at: http://en.wikipedia.org/wiki/Grid_computing; Accessed on Feb. 26, 2014; 12 pages.
Wikipedia, the free encyclopedia; "Hypertext Transfer Protocol" Available at: en.wikipedia.org/wiki/Http; Retrieved Mar. 3, 2014; 10 pages.
Wikipedia, the free encyclopedia; "MPEG-4 Part 14" container format; Available at: http://en.wikipedia.org/wiki/MPEG-4; Accessed on Jun. 27, 2014; 4 pages.
Wikipedia, the free encyclopedia; "Session Initiation Protocol" Available at: http://en.wikipedia.org/wiki/Session_Initiation_Protocol; Accessed Jun. 27, 2014; 6 pages.
Wikipedia, the free encyclopedia; "Speech Recognition" Available at: http://en.wikipedia.org/wiki/Speech_recognition; Accessed on Feb. 28, 2014; 14 pages.
Wikipedia, the free encyclopedia; "Time-lapse photography" Available at en.wikipedia.org/wiki/ Time-lapse_photography; Retrieved Mar. 3, 2014; 11 pages.
Wikipedia, the free encyclopedia; "Transmission Control Protocol" Available at: en.wikipedia.org/wiki/Transmission_Control_Protocol; Retrieved Mar. 3, 2014; 19 pages.
Wikipedia, the free encyclopedia; "VP8" Available at: http://en.wikipedia.org/wiki/VP8; Retrieved Oct. 12, 2014; 8 pages.
Wikipedia, the free encyclopedia; "Wi-Fi Direct" Available at: en.wikipedia.org/wiki/Wi-Fi_Direct; Retrieved on Apr. 29, 2014; 5 pages.
Wikipedia, the free encyclopedia; "Wii" Available at: http://en.wikipedia.org/wiki/Wii; Accessed on Feb. 25, 2014; 30 pages.
Wikipedia, the free encyclopedia; "Wolfram Alpha" Available at: http://en.wikipedia.org/wiki/Wolfram_Alpha; Accessed on Feb. 25, 2014; 6 pages.
Wikipedia, the free encyclopedia; "Xbox One" Available at: http://en.wikipedia.org/wiki/Xbox_one; Accessed on Feb. 25, 2014; 16 pages.
Wikipedia, the free encyclopedia; "XMPP" Available at: en.wikipedia.org/wiki/XMPP; Retrieved Mar. 3, 2014; 10 pages.
XMPP Standards Foundation; Available at: http://xmpp.org/xmpp-protocols/; Accessed on Oct. 2, 2014; 1 page.
Young (1998) "FundamentalsImageProcessing," 113 pages.
Zoom Video Communications, Inc.; Zoom Cloud Video Conferencing; Available at: http://www.zoom.us; Accessed on Oct. 2, 2014; 2 pages.
U.S. Appl. No. 14/106,263; Notice of Allowance dated Sep. 25, 2015; 24 pages.
U.S. Appl. No. 14/170,499; Notice of Allowance dated Nov. 5, 2015; 31 pages.
U.S. Appl. No. 14/341,009; Final Office Action dated Oct. 8, 2015; 35 pages.
U.S. Appl. No. 14/464,435; Final Office Action dated Sep. 21, 2015; 26 pages.
U.S. Appl. No. 14/472,133; Final Office Action dated Sep. 22, 2015; 26 pages.
U.S. Appl. No. 14/479,169; NonFinal Office Action dated Sep. 18, 2015; 76 pages.
U.S. Appl. No. 14/106,279; Final Office Action dated Aug. 3, 2015; 23 pages.
U.S. Appl. No. 14/106,279; Notice of Allowance dated Dec. 3, 2015; 16 pages.
U.S. Appl. No. 14/539,106; NonFinal Office Action dated Sep. 15, 2015; 45 pages.
Notification Concerning Transmittal of International Preliminary Report on Patentability by the International Bureau of WIPO for PCT International Application No. PCT/US14/14321; mailed Aug. 13, 2015; 11 pages.
U.S. Appl. No. 14/341,009; NonFinal Office Action dated Mar. 11, 2016; 34 pages.
U.S. Appl. No. 14/479,169; Final Office Action dated Feb. 5, 2016; 168 pages.
U.S. Appl. No. 14/539,106; Final Office Action dated Apr. 8, 2016; 41 pages.
Notification Concerning Transmittal of International Preliminary Report on Patentability by the International Bureau of WIPO for PCT International Application No. PCT/US14/48158; dated Jan. 26, 2016; 9 pages.

(56) References Cited

OTHER PUBLICATIONS

Notification Concerning Transmittal of International Preliminary Report on Patentability by the International Bureau of WIPO for PCT International Application No. PCT/US14/53254; dated Mar. 10, 2016; 8 pages.
Notification Concerning Transmittal of International Preliminary Report on Patentability by the International Bureau of WIPO for PCT International Application No. PCT/US14/54409; dated Mar. 17, 2016; 13 pages.
U.S. Appl. No. 14/341,009; Final Office Action dated Sep. 20, 2016; 33 pages.
U.S. Appl. No. 14/479,169; Notice of Allowance dated Jun. 20, 2016; 264 pages.
U.S. Appl. No. 14/539,106; NonFinal Office Action dated Jun. 30, 2016; 35 pages.
U.S. Appl. No. 14/702,439; NonFinal Office Action dated Sep. 16, 2016; 45 pages.
U.S. Appl. No. 14/807,523; NonFinal Office Action dated Dec. 29, 2016; 228 pages.
U.S. Appl. No. 14/539,106; Final Office Action dated Nov. 14, 2016; 39 pages.
U.S. Appl. No. 14/539,106; NonFinal Office Action dated Mar. 10, 2017; 36 pages.
U.S. Appl. No. 14/702,439; Final Office Action dated Feb. 2, 2017; 30 pages.

* cited by examiner

VIRTUAL REMOTE FUNCTIONALITY

CROSS-REFERENCES TO RELATED APPLICATIONS

This application claims the benefit, under 35 U.S.C. §119, of provisional U.S. Patent Application No. 61/987,304, filed May 1, 2014 by Shoemake et al. and titled "Virtual Remote Functionality" (referred to herein as the "'304 application"). This application is also a continuation-in-part of U.S. patent application Ser. No. 14/539,106, filed on Nov. 12, 2014 by Shoemake et al. and titled, "Automatic Content Filtering (referred to herein as the" '106 application). The '106 application is a continuation-in-part of U.S. patent application Ser. No. 14/106,263, filed on Dec. 13, 2013 by Shoemake et al. and titled "Video Capture, Processing and Distribution System" (referred to herein as the "'263 application"), which claims the benefit of provisional U.S. Patent Application No. 61/737,506, filed Dec. 14, 2012 by Shoemake et al. and titled "Video Capture, Processing and Distribution System" (referred to herein as the "'506 application"). The '106 application is also a continuation in part of U.S. patent application Ser. No. 14/170,499, filed on Jan. 31, 2014 by Shoemake et al. and titled "Video Mail Capture, Processing and Distribution" (referred to herein as the "'499 application"), which claims the benefit of provisional U.S. Patent Application No. 61/759,621, filed Feb. 1, 2013 by Shoemake et al. and titled "Video Mail Capture, Processing and Distribution" (referred to herein as the "'621 application"). The '106 application is also a continuation-in part of U.S. patent application Ser. No. 14/341,009, filed on Jul. 25, 2014 by Shoemake et al. and titled "Video Calling and Conferencing Addressing" (referred to herein as the "'009 application"), which claims the benefit of provisional U.S. Patent Application No. 61/858,518, filed Jul. 25, 2013 by Shoemake et al. and titled "Video Calling and Conferencing Addressing" (referred to herein as the "'518 application"). The '106 application is also a continuation in part of U.S. patent application Ser. No. 14/472,133, filed on Aug. 28, 2014 by Ahmed et al. and titled "Physical Presence and Advertising" (referred to herein as the "'133 application"), which claims the benefit of provisional U.S. Patent Application No. 61/872,603, filed Aug. 30, 2013 by Ahmed et al. and titled "Physical Presence and Advertising" (referred to herein as the "'603 application"). The '106 application is also a continuation in part of U.S. patent application Ser. No. 14/479,169, filed on Sep. 5, 2014 by Shoemake et al. and titled "Virtual Window" (referred to herein as the "'169 application"), which claims the benefit of provisional U.S. Patent Application No. 61/874,903, filed Sep. 6, 2013 by Shoemake et al. and titled "Virtual Window" (referred to herein as the "'903 application"). The '106 application is also a continuation in part of U.S. patent application Ser. No. 14/106,279, filed on Dec. 13, 2013 by Ahmed et al. and titled "Mobile Presence Detection" (referred to herein as the "'279 application"), which claims the benefit of provisional U.S. Patent Application No. 61/877,928, filed Sep. 13, 2013 by Ahmed et al. and titled "Mobile Presence Detection" (referred to herein as the "'928 application"). The '106 application is also a continuation-in-part of U.S. patent application Ser. No. 14/106,360 (now U.S. Pat. No. 8,914,837), filed on Dec. 13, 2013 by Ahmed et al. and titled "Distributed Infrastructure" (referred to herein as the "'360 application"). The '106 application is also a continuation-in-part of U.S. patent application Ser. No. 14/464,435, filed Aug. 20, 2014 by Shoemake et al. and titled "Monitoring, Trend Estimation, and User Recommendations" (referred to herein as the "'435 application").

This application may also be related to U.S. patent application Ser. No. 14/402,439, filed May 1, 2015 by Shoemake et al. and titled "Audio Based Remote Control Functionality" (referred to herein as the "0414.16 application").

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for providing remote control of consumer electronics devices, and, more particularly, to tools and techniques for providing virtual remote control of consumer electronics devices that do not have dedicated remote controllers.

BACKGROUND

Consumer electronics products such as televisions, digital media players (including, without limitation Roku®, Apple TV®, and/or the like), Blu-ray players, and media recording and/or playback devices (including, but not limited to video cassette recorders, digital video recorders, stereo systems, and/or the like) come packaged with dedicated remote control devices when sold. These remote control devices may use infrared (non-visible) light or may use electromagnetic waves covering other ranges of the electromagnetic spectrum. These devices are human interface devices that allow a user to control the consumer electronics products. This communication may allow the user to perform functions such as navigating menu systems, entering text, controlling functionality of the consumer electronics products, and/or the like.

Several disadvantages regarding having a dedicated remote control device to control a consumer electronic device include, but are not necessarily limited to, the dedicated remote control device adding to the cost of the product, consumers accumulating large numbers of dedicated remote controls, the remote control device becoming lost due to potential infrequent use, and/or the like.

But, if a dedicated remote control device is not included with a consumer electronics product, some fundamental problems may arise. Consider an Apple TV, for example. It may be connected to the Internet using Wi-Fi. It comes with a remote control device. The remote control device is used to setup the digital media player. If the digital media player were connected to the Internet, a cell phone app could be used to communicate with the Apple TV and control it. But, the Apple TV cannot connect to the Internet without user input. In computer science terminology, this is referred to as a "deadlock situation." There is no way to progress without the remote control device.

Latency minimization is also a concern with remote control devices. The user prefers a very quick response time from the consumer electronics product. The time for communication of a command from the remote control device (whether IR remote control or App) necessarily adds to the latency that the user experiences.

Hence, there is a need for more robust and scalable solutions for providing virtual remote control of consumer electronics devices that do not have or do not require dedicated remote controllers.

BRIEF SUMMARY

A set of embodiments provides tools and techniques for providing virtual remote control of consumer electronics devices that do not have or do not require dedicated remote controllers. By foregoing a dedicated remote controller or dedicated remote control device, the cost of consumer electronics devices can be lowered. Further, this allows the user to interface with the consumer electronics devices in simpler fashion.

Merely by way of example, some embodiments allow a consumer electronics device to connect to the Internet or other suitable network without the use of a dedicated remote controller or dedicated remote control device to send instructions to do so. Some embodiments allow for the consumer electronics device to be used by a user(s) without a dedicated remote control device at all. In some embodiments, latency minimization techniques may also be provided for communication of commands to the consumer electronics product under control.

The tools provided by various embodiments include, without limitation, methods, systems, and/or software products. Merely by way of example, a method might comprise one or more procedures, any or all of which are executed by a presence detection device ("PDD") and/or a computer system. Correspondingly, an embodiment might provide a PDD and/or a computer system configured with instructions to perform one or more procedures in accordance with methods provided by various other embodiments. Similarly, a computer program might comprise a set of instructions that are executable by a PDD and/or a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise broadcasting, with a first user device, a notification indicating that a peer-to-peer wireless connection may be established with the first user device, and establishing, with the first user device, a first peer-to-peer wireless connection with a second user device, based on a request to establish peer-to-peer wireless connection received from the second user device, the request being sent by the second user device after the second user device receives the broadcasted notification. The method might also comprise generating, with the first user device, a first pairing code for pairing with the second user device, and sending, with the first user device, the first pairing code to a first display device for display on the first display device. The method might further comprise receiving, with the first user device and from the second user device over the first peer-to-peer wireless connection, first user input including a second pairing code, determining, with the first user device, whether the second pairing code matches the first pairing code, and establishing, with the first user device, the second user device as a first remote controller for the first user device based on a determination that the second pairing code matches the first pairing code.

In some embodiments, the method might further comprise establishing, with the second user device, a network connection between the first user device and a network, and receiving, with the first user device, remote control instructions from the second user device over the network connection. The network might be at least one of an Ethernet network, a local area network ("LAN"), a wide area network ("WAN"), a wireless wide area network ("WWAN"), a virtual private network ("VPN"), an intranet, an extranet, the Internet, a public switched telephone network ("PSTN"), an infra-red network, or a radio frequency ("rf") network. According to some embodiments, receiving, with the first user device, remote control instructions from the second user device over the network connection might comprise receiving, with the first user device, remote control instructions from the second user device via a user interface of a webpage.

Merely by way of example, in some instances, the first user device might be one of a video communication device, a video calling device, an image capture device, a presence detection device, a video recording device, video playback device, an audio recording device, an audio playback device, a tablet computer, a laptop computer, a desktop computer, a toy vehicle, a toy aircraft, a drone, or a consumer electronic device sold without a dedicated remote controller, and/or any other suitable electronics device that requires user input. The video communication device might, for example, be as described in U.S. patent application Ser. No. 12/561,165, filed Sep. 16, 2009 by Shoemake et al. and titled "Real Time Video Communications System" (issued as U.S. Pat. No. 8,144,182 and referred to herein as the "'182 patent"), the disclosure of which is hereby incorporated by reference for all purposes. In some cases, the first user device might be a gaming console. The second user device might be one of a smart phone, a mobile phone, a tablet computer, a desktop computer, a laptop computer, a portable gaming device, or a remote control device (such as an original equipment manufacturer ("OEM") "smart" remote control device or an aftermarket "smart" remote control device, etc.), and/or the like.

According to some aspects, the method might further comprise establishing, with the first user device, a second peer-to-peer wireless connection with a third user device, generating, with the first user device, a third pairing code for pairing with the third user device, and sending, with the first user device, the third pairing code to a second display device for display on the second display device. The method might also comprise receiving, with the first user device and from the third user device over the second peer-to-peer wireless connection, second user input including a fourth pairing code, determining, with the first user device, whether the fourth pairing code matches the third pairing code, and establishing, with the first user device, the third user device as a second remote controller for the first user device based on a determination that the fourth pairing code matches the third pairing code.

In some instances, the method might comprise detecting, with the first user device, that the second user device is unavailable. In some cases, establishing, with the first user device, a second peer-to-peer wireless connection with a third user device might comprise establishing the second peer-to-peer wireless connection based on detecting that the second user device is unavailable.

In some embodiments, the method might further comprise receiving user input, the user input instructing the first user device to initiate pairing. In some instances, establishing, with the first user device, a second peer-to-peer wireless connection with a third user device might comprise establishing the second peer-to-peer wireless connection based on the user input. The user input might be received over a network, or received via a physical button on the first user device. In some cases, the user input might be gesture input and/or voice input, which are received and analyzed using gesture recognition and voice recognition, respectively.

According to some embodiments, the first display device and the second display device might be the same display device. Alternatively, or additionally, the first display device might be external to, and communicatively coupled with, the first user device. Merely by way of example, the first pairing code might be at least one of a personal identification number ("PIN"), a numeric combination, an alphanumeric combination, a plain text code, an image-based pairing code, a binary code, a hexadecimal code, a bar code, a matrix bar code, or a quick response ("QR") code, while the second pairing code might be at least one of a personal identification number ("PIN"), a numeric combination, an alphanumeric combination, a plain text code, an image-based pairing code, a binary code, or a hexadecimal code. In some cases, the first peer-to-peer wireless connection might be one of a Bluetooth connection, a WiFi connection, or a near field communication ("NFC") connection. In some cases, the second user device might comprise a camera that is used to capture an image of the first pairing code that is displayed on the first display device, and the second pairing code might comprise the image-captured first pairing code. In some instances, the image-based pairing code of the second pairing code and the image-based pairing code of the first pairing code may be determined to match even if they differ, so long as the difference is within a predetermined threshold.

The method, in some embodiments, might further comprise determining, with the first user device, whether a peer-to-peer connection with the second user device is available. Based on a determination that a peer-to-peer connection is available, the method might comprise communicating with the second user device over the peer-to-peer connection. Based on a determination that no peer-to-peer connection is available, the method might comprise determining whether the second user device is available on a local network to which the first user device is connected. The method might further comprise, based on a determination that the second user device is available on the local network, communicating with the second user device over the local network. The method might also comprise, based on a determination that the second user device is not available on the local network, communicating with the second user device over the Internet.

According to some embodiments, broadcasting the notification indicating that a peer-to-peer wireless connection may be established with the first user device might comprise continuously broadcasting, with a first user device, a notification indicating that a peer-to-peer wireless connection may be established with the first user device. In some instances, broadcasting the notification indicating that a peer-to-peer wireless connection may be established with the first user device might comprise broadcasting, with a first user device, a notification indicating that a peer-to-peer wireless connection may be established with the first user device, only in response to receiving a probe message from the second user device requesting that the first user device identify itself. In some embodiments, the notification indicating that a peer-to-peer wireless connection may be established with the first user device might comprise information regarding the first user device that comprises at least one of a user-selected name for the first user device, a default name for the first user device, a model name for the first user device, a model number for the first user device, or a serial number of the first user device.

Merely by way of example, in some cases, the method might further comprise receiving, with the first user device and from a media content source, media content comprising at least one of image content or video content, and sending, with the first user device, the at least one of image content or video content to the first display device for display on the first display device. When the first pairing code is sent to the first display device for display on the first display device, sending the first pairing code to the first display device for display on the first display device might comprise combining, with the first user device, the at least one of image content or video content with the first pairing code into a combined content, such that the first pairing code is superimposed over a portion of the at least one of image content or video content, when both are simultaneously displayed on the first display device. Sending the first pairing code to the first display device for display on the first display device might further comprise sending, with the first user device, the combined content for display on the first display device.

In another aspect, a first user device might comprise at least one processor, a video output interface to provide video output to a first display device, a peer-to-peer communication interface device, and a storage medium in communication with the at least one processor. The storage medium might have encoded thereon a set of instructions executable by the at least one processor to control operation of the first user device. The set of instructions might comprise instructions to broadcast a notification that a peer-to-peer wireless connection may be established with the first user device via the peer-to-peer communication interface device, and instructions to establish a first peer-to-peer wireless connection with a second user device, based on a request to establish peer-to-peer wireless connection received from the second user device, the request being sent by the second user device after the second user device receives the broadcasted notification. The set of instructions might also comprise instructions to generate a first pairing code for pairing with the second user device, and instructions to send the first pairing code to the first display device for display on the first display device. The set of instructions might further comprise instructions to receive first user input including a second pairing code from the second user device over the first peer-to-peer wireless connection, instructions to determine whether the second pairing code matches the first pairing code, and instructions to establish the second user device as a first remote controller for the first user device based on a determination that the second pairing code matches the first pairing code.

According to some embodiments, the device might further comprise a network interface device, and the set of instructions might further comprise instructions to establish a network connection, via the network interface device, between the first user device and a network, and instructions to receive remote control instructions from the second user device over the network connection. The network might be at least one of an Ethernet network, a local area network ("LAN"), a wide area network ("WAN"), a wireless wide area network ("WWAN"), a virtual private network ("VPN"), an intranet, an extranet, the Internet, a public switched telephone network ("PSTN"), an infra-red network, or a radio frequency ("rf") network. In some instances, the instructions to receive remote control instructions from the second user device over the network connection might comprise instructions to receive remote control instructions from the second user device via a user interface of a webpage.

Merely by way of example, in some instances, the first user device might be one of a video communication device, a video calling device, an image capture device, a presence detection device, a video recording device, a video playback device, an audio recording device, an audio playback device, a tablet computer, a laptop computer, a desktop computer, a toy vehicle, a toy aircraft, a drone, or a consumer electronic device sold without a dedicated remote controller, and/or any other suitable electronics device that requires user input. In some cases, the first user device might be a gaming console. The second user device might be one of a smart phone, a mobile phone, a tablet computer, a desktop computer, a laptop computer, a portable gaming device, or a remote control device (such as an original equipment manufacturer ("OEM") "smart" remote control device or an aftermarket "smart" remote control device, etc.), and/or the like.

According to some aspects, the set of instructions might further comprise instructions to establish a second peer-to-peer wireless connection with a third user device via the peer-to-peer communication interface device, instructions to generate a third pairing code for pairing with the third user device, and instructions to send the third pairing code to the second display device for display on the second display device. The set of instructions might also comprise instructions to receive second user input including a fourth pairing code from the third user device over the second peer-to-peer wireless connection, instructions to determine whether the fourth pairing code matches the third pairing code, and instructions to establish the third user device as a second remote controller for the first user device based on a determination that the fourth pairing code matches the third pairing code.

Merely by way of example, the first pairing code might be at least one of a personal identification number ("PIN"), a numeric combination, an alphanumeric combination, a plain text code, an image-based pairing code, a binary code, a hexadecimal code, a bar code, a matrix bar code, or a quick response ("QR") code, while the second pairing code might be at least one of a personal identification number ("PIN"), a numeric combination, an alphanumeric combination, a plain text code, an image-based pairing code, a binary code, or a hexadecimal code. In some cases, the first peer-to-peer wireless connection might be one of a Bluetooth connection, a WiFi connection, or a near field communication ("NFC") connection.

In some embodiments, the device might further comprise a video capture device and an audio capture device. The set of instructions might further comprise instructions to capture, using the video capture device, video data comprising physical gestures of a user, and instructions to capture, using the audio capture device, audio data comprising voice commands of the user. The set of instructions might also comprise instructions to analyze at least one of the captured video data or the captured audio data to determine one or more control commands of a plurality of predetermined control commands that matches at least one of the physical gestures of the user or the voice commands of the user, and instructions to control operation of the first user device in accordance with the one or more control commands. According to some embodiments, the one or more control commands might comprise one or more of control commands for controlling the first user device to establish the first peer-to-peer wireless connection with the second user device, control commands for controlling the first user device to establish the second user device as a first remote controller for the first user device based on a determination that the second pairing code matches the first pairing code, or control commands for causing the first user device to actuate built-in functionalities.

In yet another aspect, a method might comprise activating, with a first user device comprising a video capture device and an audio capture device, the video capture device and the audio capture device, in response to being connected to a power source. The method might also comprise capturing, using the video capture device, video data comprising physical gestures of a user, and capturing, using the audio capture device, audio data comprising voice commands of the user. The method might then comprise analyzing, with the first user device, at least one of the captured video data or the captured audio data to determine one or more control commands of a plurality of predetermined control commands that match at least one of the physical gestures of the user or the voice commands of the user, wherein the one or more control commands comprises control commands to establish a network connection with a server over a network. The method might further comprise establishing, with the first user device, the network connection with the server over the network, in accordance with the one or more control commands, and establishing, with the server, a second user device as a first remote controller for the first user device.

In still another aspect, a method might comprise wirelessly pairing a first device with a second device, wherein the first device has no user input facilities (or capability—i.e., no user input device such as a key pad, a dedicated remote controller, a camera, a voice or audio input device, and the like). In some cases, the first device might have a network interface and/or wireless capacity (including, but not limited to, one or more of Bluetooth connectivity capability, a WiFi connectivity capability, or a near field communication ("NFC") connectivity capability, Infrared ("IR") connectivity capability, Ultraviolet ("UV") connectivity capability, and/or the like).

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
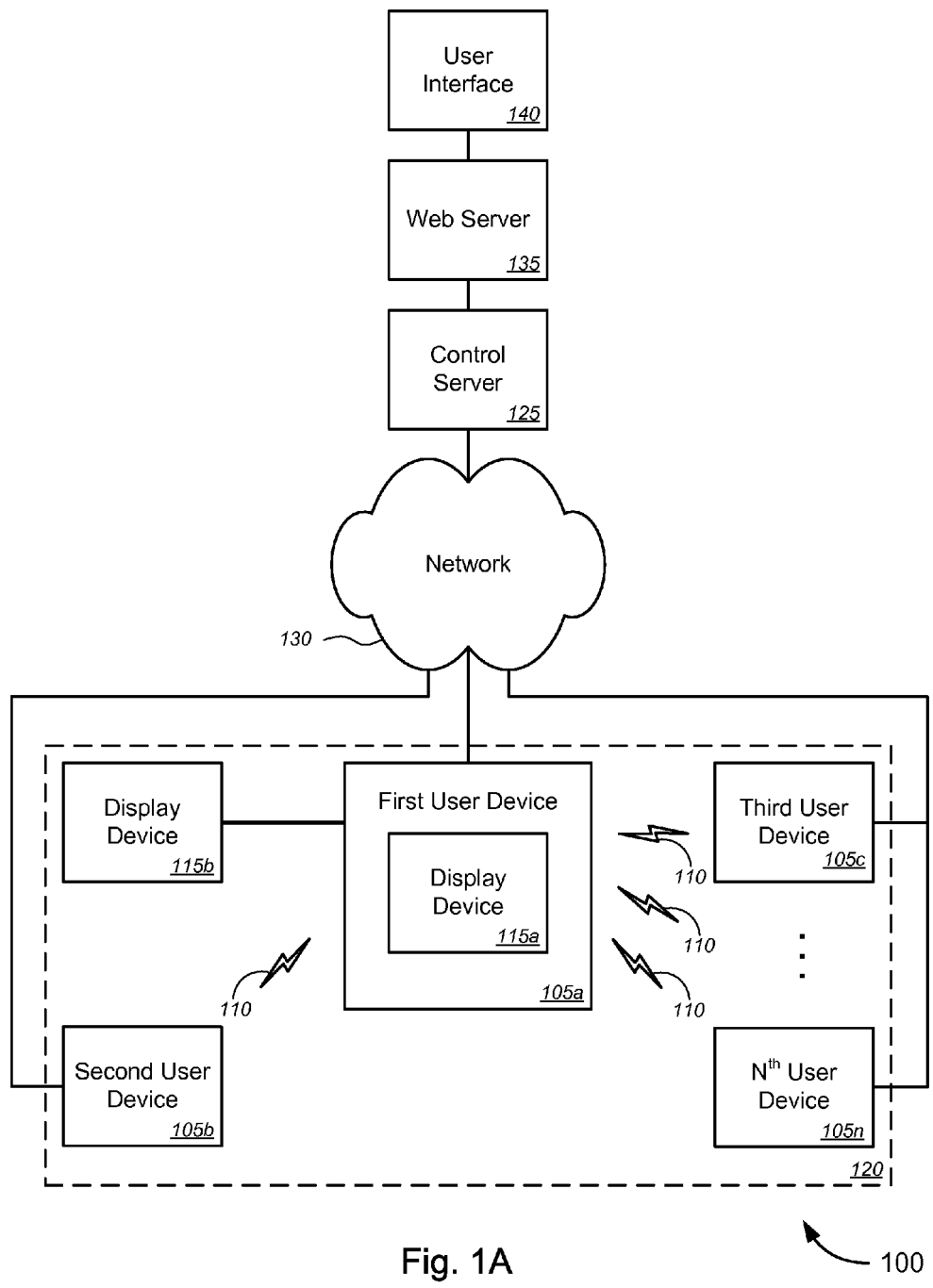
FIGS. 1A and 1B are block diagrams illustrating various systems for providing virtual remote control functionality, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features Provided by Various Embodiments

Various embodiments provide tools and techniques for providing virtual remote control of consumer electronics devices that do not have or do not require dedicated remote controllers. By foregoing a dedicated remote controller or dedicated remote control device, the cost of consumer electronics devices can be lowered. Further, this allows the user to interface with the consumer electronics devices in simpler fashion.

Merely by way of example, some embodiments allow a consumer electronics device to connect to the Internet or other suitable network without the use of a dedicated remote controller or dedicated remote control device to send instructions to do so. Some embodiments allow for the consumer electronics device to be used by a user(s) without a dedicated remote control device at all. In some embodiments, latency minimization techniques may also be provided for communication of commands to the consumer electronics product under control.

Various methods for pairing are described below. These methods, however, are intended to merely be illustrative, and are in no way intended to limit the scope of the various embodiments.

Pairing with Gesture or Voice Recognition

In some embodiments, a first user device (such as a consumer electronics ("CE") device) might be connected to an external display device, and/or might include a display device incorporated therein (i.e., in the case of a television or monitor, or the like). The first user device might display a list of Wi-Fi networks in the area. Using gesture and/or voice recognition, the first user device might receive user inputs (in the form of gesture and/or voice input) that indicate the user's selection of a network from among the list of Wi-Fi networks, and optionally may receive user inputs including a password for the selected network.

Once the device is connected to the Internet via the selected network, a second user device (including, without limitation, a smart phone, tablet computer, and/or the like) might be used to communicate with the first user device over the Internet, and, in some cases, might utilize software application ("App"; including, but not limited to, a smartphone App, tablet computer App, and/or the like) to do so. The connection of the first user device to the App may occur via an identification mechanism. For example, the identification mechanism may include display of a code on the display device by the first user device, and entry of the displayed code via the App running on the second user device.

Once the App is connected (or paired) with the first user device, the second user device may be used to issue commands or instructions to remotely control the first user device. These commands may include, without limitation, volume up, volume down, cursor movement, etc. The App may display controls on its screen that may be depressed or otherwise selected by the user, or the unit may take input via moving the remote control and using its motion sensor. The input may include gesture input via an image capture device (e.g., camera, etc.) from the second user device (e.g., smartphone or tablet computer, etc.). The input may also be taken via microphone from the second user device (e.g., smartphone or tablet computer, etc.). The image, video, or audio data may be interpreted in the second user device and commands may be sent to the first user device, or the raw image, video, or audio data may be sent to the first user device for processing. In some cases, where remote control is via the network, raw image, video, or audio data may be sent to a server (or distributed infrastructure elements in a cloud environment, such as the user devices described in detail in the '360 application (already incorporated by reference herein in its entirety for all purposes)) for processing.

In various embodiments, multiple user devices (including, without limitation, smart phones or tablet computers, etc.; similar to the second user device) may be paired with the first user device. This may be desirable if a family wants to be able to control a user device (e.g., a TV, media player, or gaming console) using one or more of these user devices.

Pairing without Gesture or Voice Recognition

In some embodiments, a first user device might display a personal identification number ("PIN") or pairing code on a screen of a display device (which might be integrated with, or external to, the first user device), similar to the example described above. The first user device and a second user device (including, without limitation, a smartphone, a tablet computer, and/or the like) might be operational using a communication technology that allows pairing, including, but not limited to, Bluetooth™ technology, WiFi technology, or near field communication ("NFC") technology.

Using the second user device (and more specifically, using an App for the smart phone, tablet computer, and/or the like), users might select connection with the first user device, e.g., by depressing or otherwise selecting a "connect" button, a pairing button, a link, and/or the like. The user then enters the PIN or pairing code that is displayed on the screen of the display device into the App running in the second user device. The two devices then use standard pairing protocols (including, but not limited to, Bluetooth™ protocols).

Once the devices are paired, the communication link might be used to setup the first user device. In an example, the first user device might scan for Wi-Fi networks, which are then communicated through the Bluetooth™ connection and displayed on the smartphone. The user selects one of the Wi-Fi networks from those displayed on the smartphone (and optionally enters a password for the selected Wi-Fi network). The first device then connects to the selected Wi-Fi network. The controlling device (i.e., the smartphone or second user device) might then send commands to the first user device via Bluetooth™ connection or through the Internet connection—selection of which may be determined by lowering latency, lowering power consumption, and/or based on which communication path is active/functional.

In the various embodiments, there is never a need to use a dedicated remote control (otherwise referred to herein as "remote controller" or "remote control device"). This is a key advantage for manufacturers of consumer electronics devices, because they can ship each device in a box, without shipping a dedicated remote control in the box, and the user can simply connect it to a display device, plug it in, and then is able to completely set it up and use it (i.e., without the dedicated remote control). Another advantage of these techniques includes the ability to remotely control the consumer electronics device via the Internet (by any paired user device), i.e., after the connection has been established using the second user device.

Further, referring to the examples above, the first user device and the second user device (e.g., smartphone or tablet computer) may communicate via a server in the cloud environment. This server may be able to tell the smartphone or tablet computer if the first user device is available or not, and it may be able to tell the first user device if there are devices connected to control it. When there is a device connected to control it, the first user device may respond by turning on the display, as an example.

Need to Pair at any Time

When a CE device ships without a dedicated remote control, it is desirable to always have the ability to pair the CE device with a controlling device, even if the CE device has already been paired. This is due to the fact that the controlling device may not always be present (e.g., in the case of a mobile phone or smart phone), the controlling device may also get lost, the controlling device may be replaced with a newer model, etc. In this type of scenario, the CE device would be in a dead-lock situation without the ability to re-pair itself to another controlling device.

There are several mechanisms that allow a device to be paired and re-paired at any time, which include the following: always allowing for the option to pair on a physical reboot of the device (for example, a device that no longer has a controlling device can be rebooted (e.g., using a physical button, a soft button, a switch, power reset, etc.), which automatically brings up a pairing option; providing a physical button, a soft button, a switch, and/or the like, on the CE device to enable triggering of pairing with another device (in this manner, if the controlling device is unavailable, another controlling device can always be setup by pressing the physical button, soft button, switch, and/or the like); allowing proximity detection of the controlling device to trigger pairing (for example, if a controlling device is not detected nearby, then the pairing option can automatically be displayed on the screen; examples of proximity can include making a Bluetooth or NFC connection with the controlling device or finding the controlling device on the same local network); and allowing for Internet-triggered re-pairing (in the case of a CE device that has already been connected to the Internet, a web-based interface to the CE device via a side channel such as TCP can be used to trigger pairing to another controlling device).

Preventing Unauthorized Pairings

With CE devices that do not ship with a dedicated remote control, it is also important to prevent pairing with unauthorized devices. This prevents authorized access and control of the CE device. There are many mechanisms for preventing unauthorized pairing. These include, but are not limited to, authentication of the controlling device and requiring physical proximity to enable pairing. For authentication of the controlling device, as part of the pairing process, information that makes the controlling device uniquely identifiable (for example, the MAC address) is stored on the CE device. The authentication information prevents unauthorized controlling devices to control the CE device. Requiring physical proximity to the CE device can prevent unauthorized pairings, as it presumes physical access to the CE device, which can deter many unauthorized pairings. Examples of methods that require physical proximity include, without limitation, pressing a button on the CE device to pair, using a wireless technique for pairing that requires proximity such as NFC or Bluetooth™.

Latency Minimization

Latency minimization is important. The second user device or controlling device (e.g., smartphone, tablet computer, etc.) may seek to select the lowest latency method for communicating with the first user device. This prioritization may be in the order as follows: peer-to-peer connection, e.g., Bluetooth™ or Wi-Fi ad hoc (which represents a good case); connection on the same local subnet (wired or wireless) (which represents another good case); and connection using standard Internet routing, where routing and latency are unknown (which represents the worst case).

Gesture and Voice Recognition

In gesture recognition, there may be a key symbol that the camera is always looking for, e.g., an open hand. If that happens, it may be a trigger for a first device, e.g., a CE device, to take or receive user input (in the form of gesture input). This may cause the device to open its menu, make the display active, etc.

The same may apply to voice recognition, e.g., where a user may say a control phrase to trigger the menu to start or for the system to be activated to receive a directive, e.g., "Computer, Call Bob." or "Computer, Watch TV."

Exemplary Embodiments

FIGS. 1-6 illustrate exemplary embodiments that can provide some or all of the features described above. The methods, systems, and apparatuses illustrated by FIGS. 1-6 may refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1B:
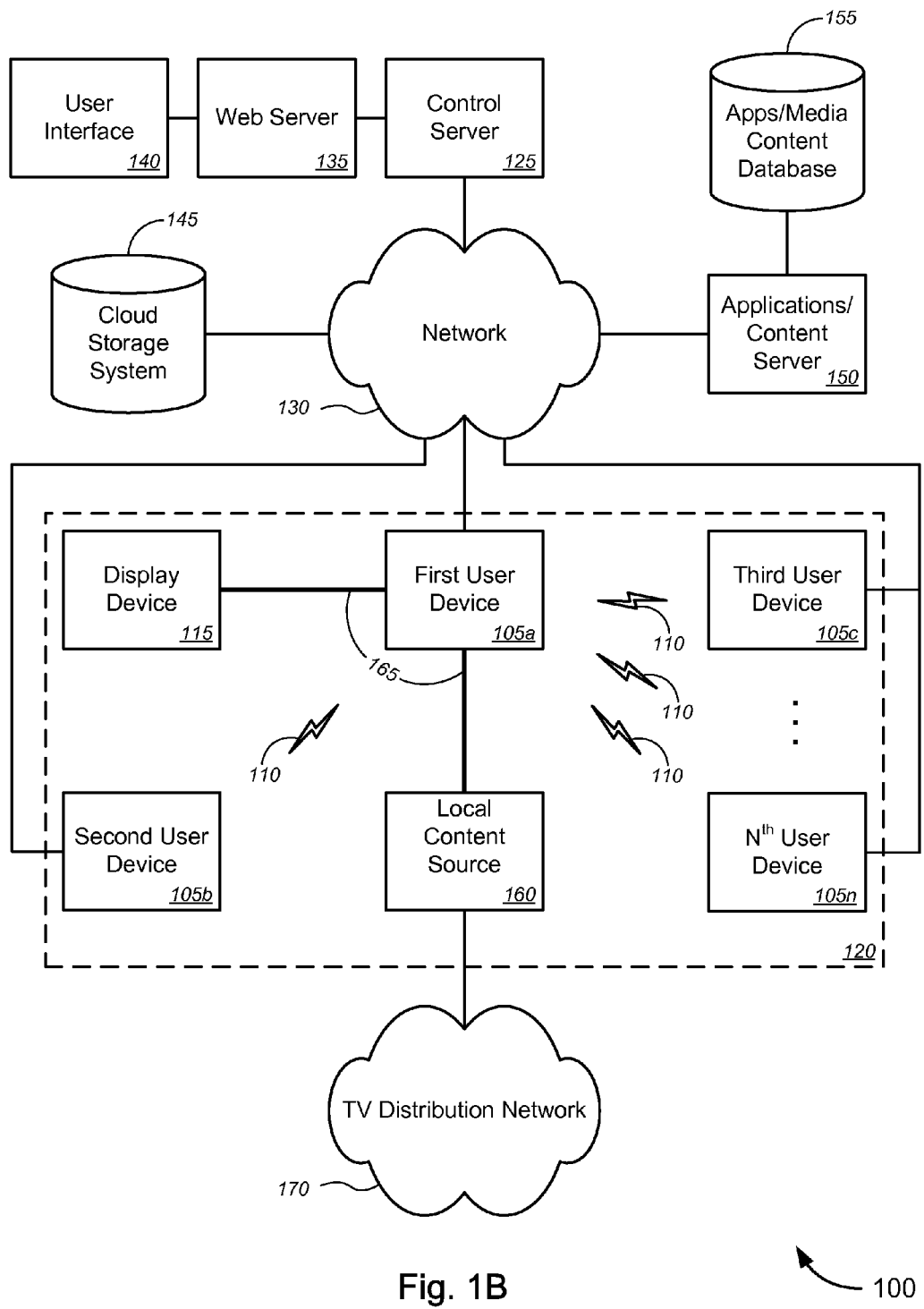

FIGS. 1A and 1B (collectively, "FIG. 1") illustrate functional diagrams of various systems 100 for providing virtual remote control functionality, and, in some embodiments, providing virtual remote control of consumer electronics devices that do not have or do not require dedicated remote controllers. The skilled reader should note that the arrangement of the components illustrated in FIG. 1 is functional in nature, and that various embodiments can employ a variety of different structural architectures. Merely by way of example, one exemplary, generalized architecture for the system 100 is described below with respect to FIG. 5, but any number of suitable hardware arrangements can be employed in accordance with different embodiments.

In FIG. 1, system 100 might comprise a plurality of user devices 105, which might include, without limitation, any one or any combination of a video communication device, a video calling device, an image capture device, a presence detection device, a video recording device, a video playback device, an audio recording device, an audio playback device, a tablet computer, a laptop computer, a desktop computer, a toy vehicle, a toy aircraft, a drone, or a consumer electronic device sold without a dedicated remote controller. In some cases, the plurality of user devices 105 might also include, but is not limited to, a gaming console, a smart phone, a mobile phone, a portable gaming device, or a remote control device, and/or the like. The plurality of user devices 105 might include a first user device 105a, which might be a device intended to be controlled remotely, and second through $N^{th}$ user devices 105b-105n, which might be devices intended to serve as (non-dedicated) remote controllers or remote control devices for the first user device 105a. In some embodiments, only a second user device 105b might be established as a remote controller for the first user device 105a. In alternative embodiments, any number of user devices among the second through $N^{th}$ user devices 105b-105n might be established as remote controllers for the first user device 105a.

Herein, a "dedicated remote controller" or "dedicated remote control device" might refer to a remote controller that is packaged with a user device for which it controls, and is, in most cases, manufactured for that sole purpose. On the other hand, a "non-dedicated remote controller" or "non-dedicated remote control device" might refer to a remote controller that is sold separately from the device to be controlled, and is, in most cases, manufactured to also perform functions separate from, and unrelated to, remote control of said device to be controlled.

In particular embodiments, the first user device 105a might be or might include one of a video communication device, a video calling device, an image capture device, a presence detection device, a video recording device, a video playback device, an audio recording device, an audio playback device, a tablet computer, a laptop computer, a desktop computer, a toy vehicle, a toy aircraft, a drone, a gaming console, or a consumer electronic device sold without a dedicated remote controller, or any other suitable electronics device that requires user input. Each of the second through $N^{th}$ user devices 105b-105n might be or might include one of a smart phone, a mobile phone, a tablet computer, a desktop computer, a laptop computer, a portable gaming device, or a remote control device (such as an original equipment manufacturer ("OEM") "smart" remote control device or an aftermarket "smart" remote control device, etc.), or the like.

To establish one or more of the second through $N^{th}$ user devices 105b-105n as remote controllers or remote control devices for the first user device 105a, a corresponding peer-to-peer wireless connection (indicated by the lightning bolts 110 in FIG. 1) must be established between the first user device 105a and each of the one or more of the second through $N^{th}$ user devices 105b-105n. System 100 might further comprise one or more display devices 115, which might include an incorporated or integrated display device 115a and/or an external display device 115b. In particular, the integrated display device 115a might be part of, or otherwise incorporated into, the first user device 105a, while the external display device 115b might be external to, but in communication with, the first user device 105a. In some embodiments, the integrated display device 115a might include, but is not limited to, an integrated touchscreen device, a removable display device (including touchscreen display and/or non-touchscreen display), and/or the like, while the external display device 115b might include, without limitation, an external monitor, a television (including, without limitation, a cable television ("TV"), a high-definition ("HD") TV, an Internet Protocol ("IP") TV, a satellite TV, and/or the like), and/or any other suitable external display device.

In various embodiments, the first user device 105a might be located at customer premises 120, and, in some embodiments, each of at least one of the second through $N^{th}$ user devices 105b-105n might also be located in the same customer premises 120. In some alternative embodiments, one or more of the second through $N^{th}$ user devices 105b-105n might be located outside the customer premises 120, and might be configured to remotely control the first user device 105a via control server 125 over network 130. According to some embodiments, network 130 might include at least one of an Ethernet network, a local area network ("LAN"), a wide area network ("WAN"), a wireless wide area network ("WWAN"), a virtual private network ("VPN"), an intranet, an extranet, the Internet, a public switched telephone network ("PSTN"), an infra-red network, or a radio frequency ("rf") network, and/or the like. In some embodiments, once established as remote controllers for the first user device 105a, any of the second through $N^{th}$ user devices 105b-105n might be configured to provide remote control functionality via a user interface 140 (e.g., a user interface of a webpage, or the like) via a web server 135 in communication with the control server 125, and thus would allow a user to remotely control the first user device 105a over network 130 by using any or a combination of the network enabled second through $N^{th}$ user devices 105b-105n.

In some embodiments, as shown in FIG. 1B, system 100 might further comprise a local content source 160 (which, in some embodiments, might include a set-top box ("STB") and/or the like), and high-definition ("HD") data cables 165 (or any other suitable data transmission media). In some cases, the HD data cables 165 might include, without limitation, high-definition multimedia interface ("HDMI") cables or any other suitable HD data cables. The first user device 105a, as shown in FIG. 1, might be configured to provide pass-through audio and/or video from a local content source 160 to display device 115 (e.g., using data cables 165). Merely by way of example, in some embodiments, a HD data input port (e.g., a HDMI input port) in the first user device 105a allows HD signals to be input from the corresponding local content source 160, and a HD data output port (e.g., a HDMI output port) in the first user device 105a allows HD signals to be output from the first user device 105a to the corresponding display device 115 (e.g., monitor or TV, which might include, but is not limited to, an IPTV, a HDTV, a cable TV, or the like). The output HD signal may, in some cases, be the input HD signal modified by the user device 105a. Local content source 160 might be any suitable local content source. As described herein, a local content source is any device that provides an audio or video stream to a display device (and thus can include, without limitation, a cable STB, a satellite STB, an IPTV STB, devices that generate video and/or audio, and/or acquire video and/or audio from other sources, such as the Internet, and provide that video/audio to a display device, and/or the like). Hence, when situated functionally inline between a local content source and a display device, the first user device 105a can receive an audiovisual stream output from the local content source, modify that audiovisual stream in accordance with the methods described in the '182 patent, and provide the (perhaps modified) audiovisual stream as input to the display device 115. In some embodiments, the first user device 105a, local content source 160, display device 115, and any of second through $N^{th}$ user devices 105b-105n might be located at customer premises 120, while, in some other embodiments, some or all of second through $N^{th}$ user devices 105b-105n might be located outside customer premises 120.

According to some embodiments, system 100 might further comprise one or more access points (not shown), each of which might be located in proximity to or in the customer premises 120. The access point(s) can allow wireless communication between each user device 105 and network 130. (Of course, a user device 105 might also have a wired connection to an access point, router, residential gateway, etc., such as via an Ethernet cable, which can provide similar communication functionality.) In some cases (as shown), each user device 105 might be communicatively coupled to network 130 (via either wired or wireless connection), without routing through any access points. In some cases, wired or wireless access to network 130 allows user device 105 to obtain profiles from cloud storage system 145 and/or applications/media content from applications/content server 150 and applications/media content database 155 independent of the corresponding local content source 160, which is in communication with a television ("TV") distribution network 170 (either via wireless connection or via wired connection). In some cases (not shown), TV distribution network 170 (which could be, for example, a cable television distribution network, a satellite television distribution network, an IPTV distribution network, and/or the like) might be communicatively coupled with content server 150, and thus local content source 160 might obtain media content from content server 150 and media content database 155 independently of user device 105a. Alternatively or in addition, the television distribution network 170 might be communicatively coupled to other content servers and/or other media content sources (not shown).

In this manner, the first user device 105a, in some embodiments, can overlay the input signal from the corresponding local content source 160 with additional media content to produce an augmented output HD signal to the corresponding display device 115 via data cables 165. This functionality allows for supplemental content (which may be associated with the media content accessed by the local content source 160 for display on display device 115) to be accessed and presented using the first user device 105a, in some cases, as a combined presentation on the display device 115, which may be one of an overlay arrangement (e.g., a picture-in-picture ("PIP") display, with the supplemental content overlaid on the main content), a split screen arrangement (with the supplemental content adjacent to, but not obscuring any portion of the main content), a passive banner stream (with non-interactive supplemental content streaming in a banner(s) along one or more of a top, bottom, left, or right edge of a display field in which the main content is displayed on display device 115), and/or an interactive banner stream (with interactive supplemental content streaming in a banner(s) along one or more of a top, bottom, left, or right edge of a display field in which the main content is displayed on display device 115). Herein, examples of interactive supplemental content might include, without limitation, content that when streamed in a banner can be caused to slow, stop, and/or replay within the banner, in response to user interaction with the content and/or the banner (as opposed to passive banner streaming, in which information is streamed in a manner uncontrollable by the user). The interactive supplemental content that is streamed in the banner may, in some instances, also allow the user to invoke operations or functions by interacting therewith; for example, by the user highlighting and/or selecting the supplemental content (e.g., an icon or still photograph of a character, actor/actress, scene, etc. associated with the main content), links for related webpages, links to further content stored in media content database 155, or operations to display related content on display device 115 and/or second through $N^{th}$ user devices 105b-105n may be invoked.

In some instances, first user device 105a might detect the presence and/or proximity of one or more of the second through $N^{th}$ user devices 105b-105n (which may or may not be associated with the user), and might (based on user profile information associated with the user that is stored, e.g., in cloud storage system 145) automatically send supplemental media content via wireless link 110 (directly from first user device 105a or indirectly via an access point (not shown)) for display on a display screen(s) of the one or more of the second through $N^{th}$ user devices 105b-105n. In one non-limiting example, a user associated with the first user device 105a might have established a user profile stored in cloud storage system 145 that indicates a user preference for any and all supplemental content for movies and television programs to be compiled and displayed on one or more of the second through $N^{th}$ user devices 105b-105n (including, but not limited to, a tablet computer, a smart phone, a laptop computer, and/or a desktop computer, etc.) concurrent to display of the movie or television program being displayed on display device 115. In such a case, when a movie is playing on display device 115 broadcast or streamed via local content source 160 from content server 170 and media content database 150 (and/or from some other content server and some other media content source) via network 170, first user device 105a accesses supplemental content (if available) from content server 170 and media content database 150 via network 130, and sends the supplemental content to the on one or more of the second through $N^{th}$ user devices 105b-105n (e.g., user's tablet computer and/or smart phone, and/or the like) via wireless link(s) 110. For example, bios of actors, actresses, and/or crew might be sent to the user's smart phone for display on the screen thereof, while schematics of machines, weapons, robots, tools, etc. associated with the movie or television show might be sent to and displayed on the user's tablet computer, behind the scenes videos or information, news/reviews associated with the main content, and/or music videos associated with the main content may also be sent to the user's smart phone and/or tablet computer, and so on.

According to some embodiments, the detection of the presence of one or more of the second through $N^{th}$ user devices 105b-105n by the first user device 105a might allow identification of a user and thus access of profiles and/or content associated with the user's account, regardless of whether the first user device 105a is owned by and/or associated with the user. This presence detection functionality is described in detail in the '279 application (already incorporated herein by reference in its entirety for all purposes).

In some embodiments, the first user device 105a might be a video capture device, and one or more of the second through $N^{th}$ user devices 105b-105n might provide virtual remote control of the video capture device over the network, as described in detail herein and as described in detail in the '263 application (already incorporated herein by reference in its entirety for all purposes). In some aspects, the first user device 105a might serve as a distributed infrastructure element in a cloud-computing system, and one or more of the second through $N^{th}$ user devices 105b-105n might provide virtual remote control of the distributed infrastructure element over the network, as described in detail herein and as described in detail in the '360 application (already incorporated herein by reference in its entirety for all purposes). According to some embodiments, the first user device 105a might provide functionality for enabling or implementing video mail capture, processing, and distribution, one or more of the second through $N^{th}$ user devices 105b-105n might provide virtual remote control of the distributed infrastructure element over the network, as described in detail herein and as described in detail in the '499 application (already incorporated herein by reference in its entirety for all purposes).

Although some of the embodiments described above refer to media content delivery, processing, distribution, or otherwise, through the first user device 105a, and remote control of first user device 105a using one or more of the second through $N^{th}$ user devices 105b-105n, the various embodiments need not deliver, process, or distribute media content through the first user device 105a. Rather, in some alternative embodiments, other functionalities of the first user device 105a may be remotely controlled using one or more of the second through $N^{th}$ user devices 105b-105n. Take, for example, the case where the first user device 105a comprises a toy vehicle, toy aircraft, or a drone. In such instances, the one or more of the second through $N^{th}$ user devices 105b-105n might be established as remote controllers for the toy vehicle, toy aircraft, or drone, and thus are provided with functionality to control the movement and other functions (e.g., any of lights, sounds, camera functions, and/or the like) of the toy vehicle, toy aircraft, or drone. Likewise, with other embodiments of the first user device 105a, other functionalities, including, but not limited to, any camera functionalities, any settings controls, any data transfer preferences and controls, any communications settings or controls, and/or the like, may be controlled by any one or more of the second through $N^{th}$ user devices 105b-105n that have been established as remote controllers for these embodiments of the first user device 105a.

Further, the system 100, according to the various embodiments allows for minimizing latency between user input (using any of the second through $N^{th}$ user device 105b-105n) and actual remote control of functionalities of the first user device 105a. In some embodiments, to minimize latency, the system might first attempt to establish a peer-to-peer connection between the first user device 105a and at least one of the second through $N^{th}$ user devices 105b-105n. If that fails, then the system might attempt to establish connection via a local subnet. If such attempt fails, then the system might attempt to establish connection via the Internet.

Figure 2A:
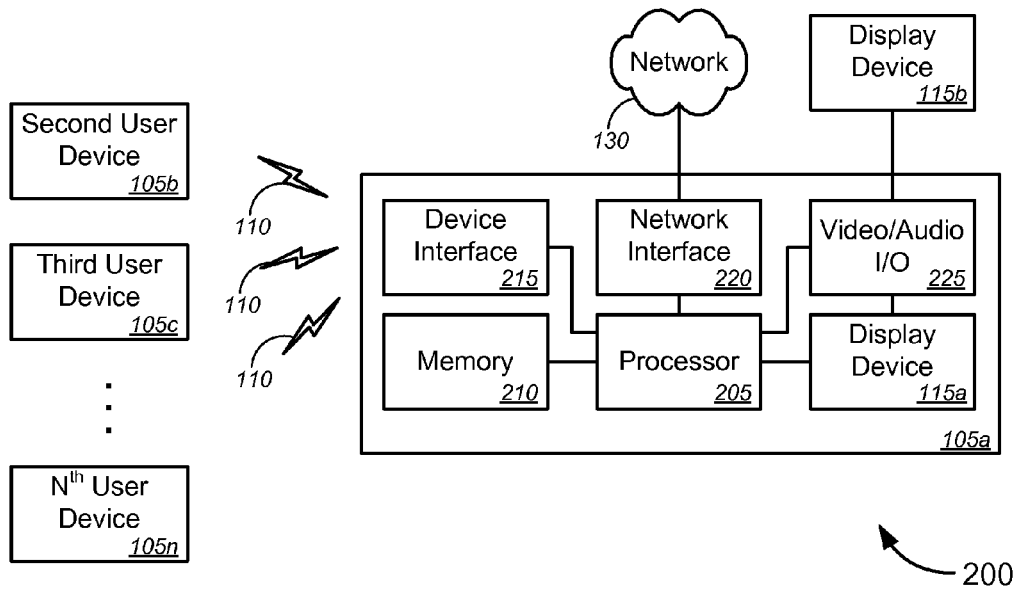
FIGS. 2A and 2B are block diagrams illustrating systems having various apparatuses that may be controlled via virtual remote control functionality, in accordance with various embodiments.
Figure 2B:
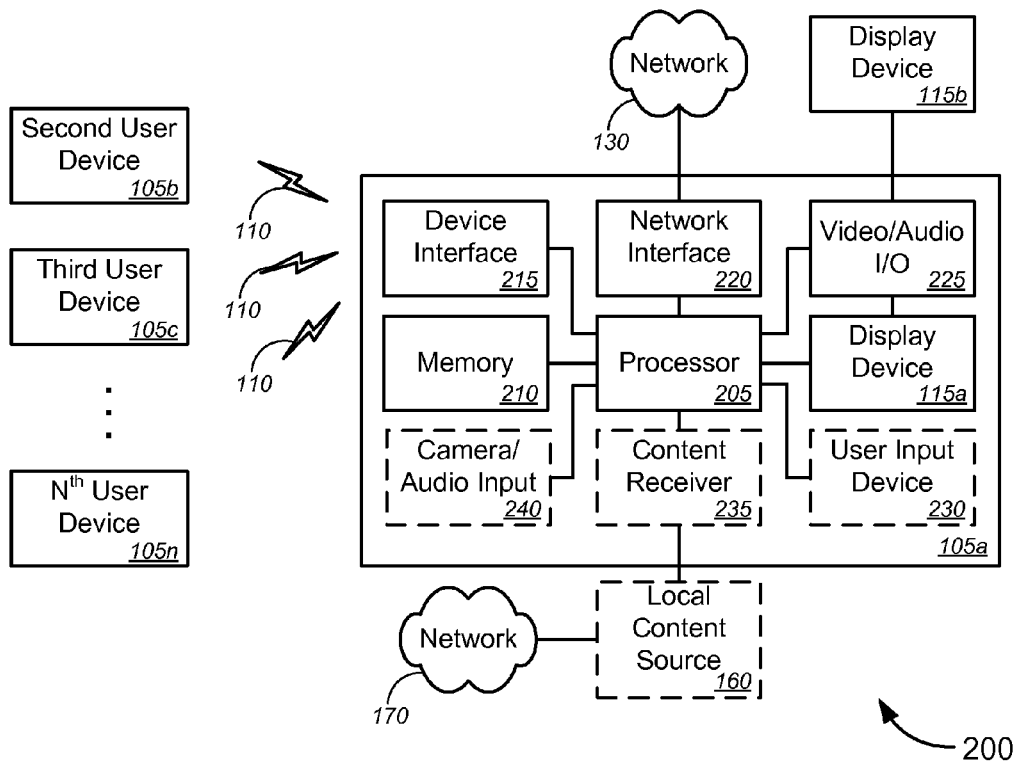

With reference to FIGS. 2A and 2B (collectively, "FIG. 2")—which are block diagrams illustrating systems 200 having various apparatuses that may be controlled via virtual remote control functionality, in accordance with various embodiments—, system 200 is shown comprising elements or components of system 100 shown in FIG. 1, with particular focus on components or subcomponents of the first user device 105a.

In the embodiment shown in FIG. 2A, system 200 might comprise the first user device 105a, at least one of second through $N^{th}$ user devices 105b-105n, wireless links 110 communicatively coupling the first user device 105a to the at least one of second through $N^{th}$ user devices 105b-105n, integrated display device 115a and/or an external display device 115b, and network 130. System 200 may or may not include other components of system 100 shown in FIGS. 1A and 1B, which are not shown in FIG. 2A to avoid overly complicating the illustrated example. In some embodiments, the first user device 105a might comprise one or more processors 205, one or more memory devices 210, one or more device interfaces 215, and one or more network interfaces 220. The one or more device interfaces 215 might be configured to establish wireless communication (e.g., via wireless links 110) with at least one of second through $N^{th}$ user devices 105b-105n. The wireless communication might comprise peer-to-peer wireless communication, or any other suitable types of wireless communication. In that regard, the wireless communication might include, without limitation, infra-red ("IR") communication, ultraviolet ("UV") communication, a WiMax communication, a WWAN communication, Bluetooth™ communication, WiFi communication, communication using any other suitable protocol of the 802.11 suite of protocols, cellular communication, near field communication ("NFC"), and/or the like.

In some instances, the first user device 105a might further comprise an integrated display device 115a, while in other instances (not shown), the first user device 105a might not have any integrated display device 115a. In other cases, the first user device 105a might further comprise one or more video/audio input/output ("I/O") devices 225 that may be configured to communicatively couple to one or more external display devices 115b. In some cases, the one or more video/audio input/output ("I/O") devices 225 might be communicatively coupled to one or more external display devices 115b via HD data cables (such as, but not limited to, HD data cables 165 described above). According to some aspects, the first user device 105a might comprise both the integrated display device 115a and the one or more video/audio input/output ("I/O") devices 225.

In the embodiment shown in FIG. 2B, system 200 might further comprise a first user device 105a further including at least one of one or more user input devices 230, one or more content receivers 235, and/or one or more cameras/audio inputs 240. The one or more user input devices 230 might include, but are not limited to, mice and other pointing devices, touchpads and/or touchscreens, keyboards (e.g., numeric and/or alphabetic), buttons, switches, and/or the like. The one or more cameras 240 might include, without limitation, motion capture devices or other suitable image/video capture devices. The audio input devices might include, but is not limited to, microphones or other suitable audio capture devices. The one or more content receivers 235 might each be communicatively coupled with local content source 160, and in turn communicatively coupled with network 170. In some embodiments, the first user device 105a might receive, from the local content source 160 (which might also be referred to as a "media content source"), media content including, but not limited to, at least one of image content or video content (and in some cases, audio and/or gaming content as well). The first user device might send the at least one of image content or video content to the display device 115a or 115b for display thereon. According to some embodiments, due to the "pass-through" functionality of the first user device 105a, any pairing codes that are sent from the first user device 105a to the display device 115a or 115b for display thereon might first be combined with the at least one of image content or video content into a combined content, prior to sending the combined content to the display device 115a or 115b, such that (when both are simultaneously displayed on the display device 115a or 115b as a combined image or video content), the pairing code(s) is superimposed over a portion (or sub-portion) of the at least one of image content or video content. First user device 105a, second through $N^{th}$ user devices 105b-105n, and other components of system 200 in FIG. 2 might otherwise function in a similar manner as described above with respect to first user device 105a, second through $N^{th}$ user devices 105b-105n, and other components of system 200 in FIG. 1.

Figure 3A:
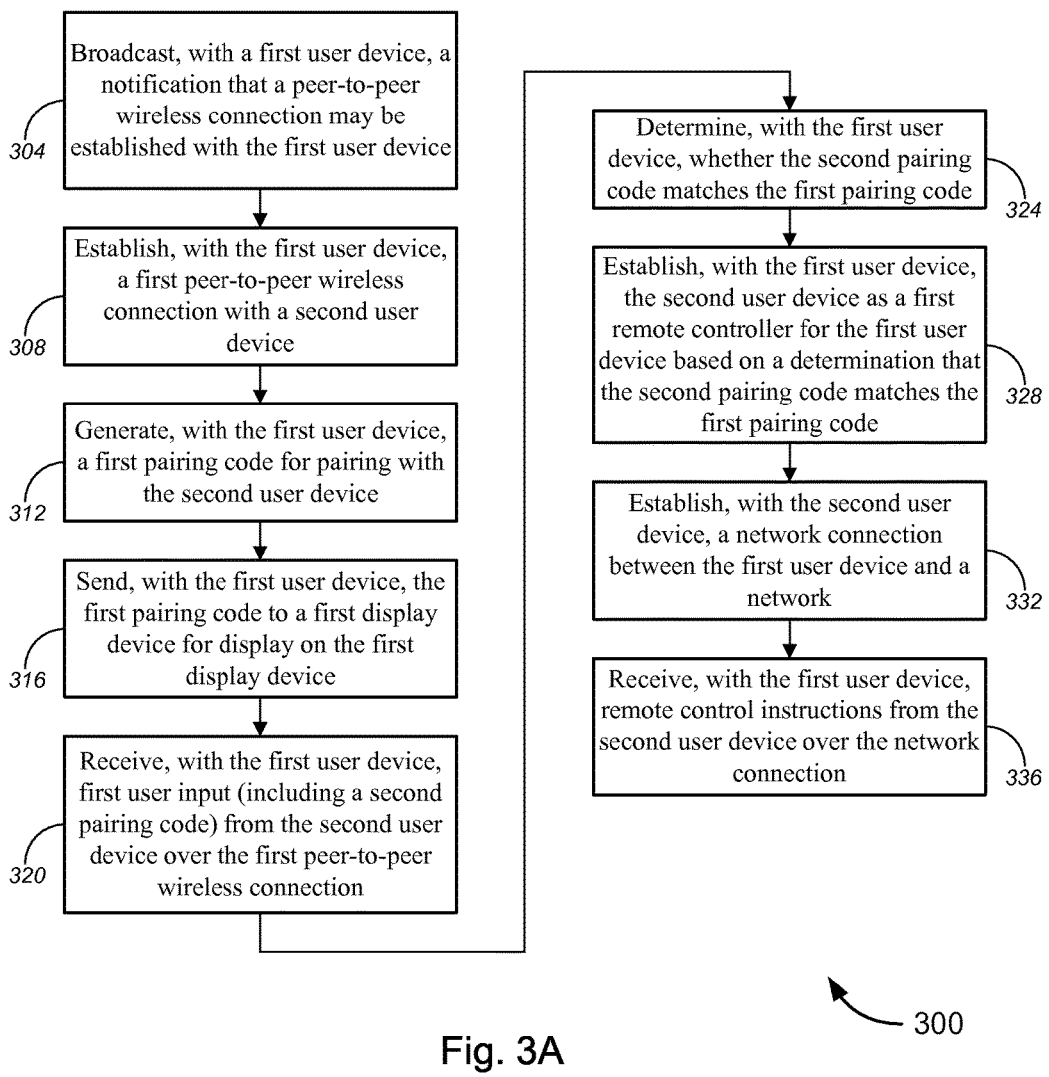
FIGS. 3A-3E are process flow diagrams illustrating various methods of providing virtual remote control functionality, in accordance with various embodiments.
Figure 3B:
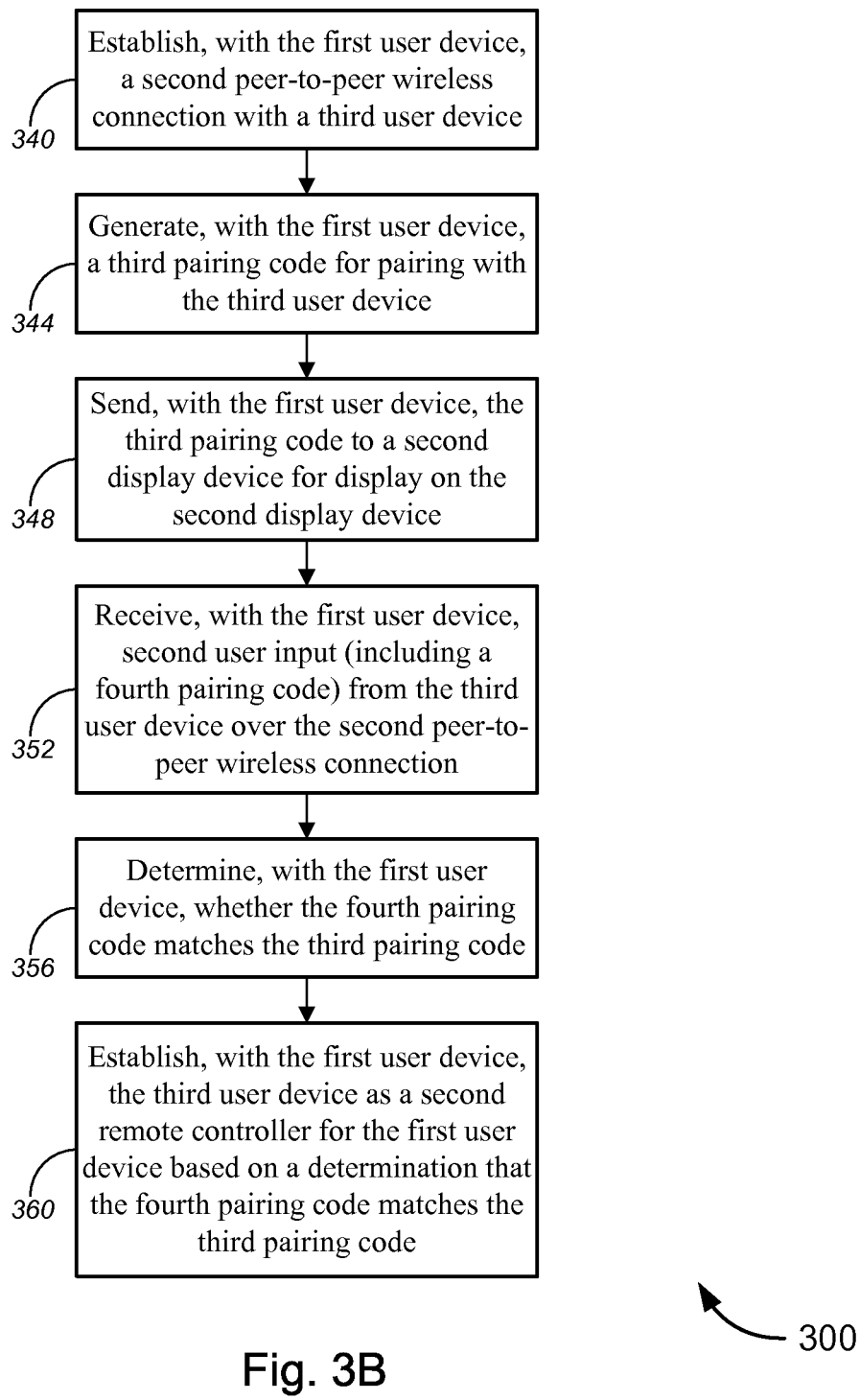
Figure 3C:
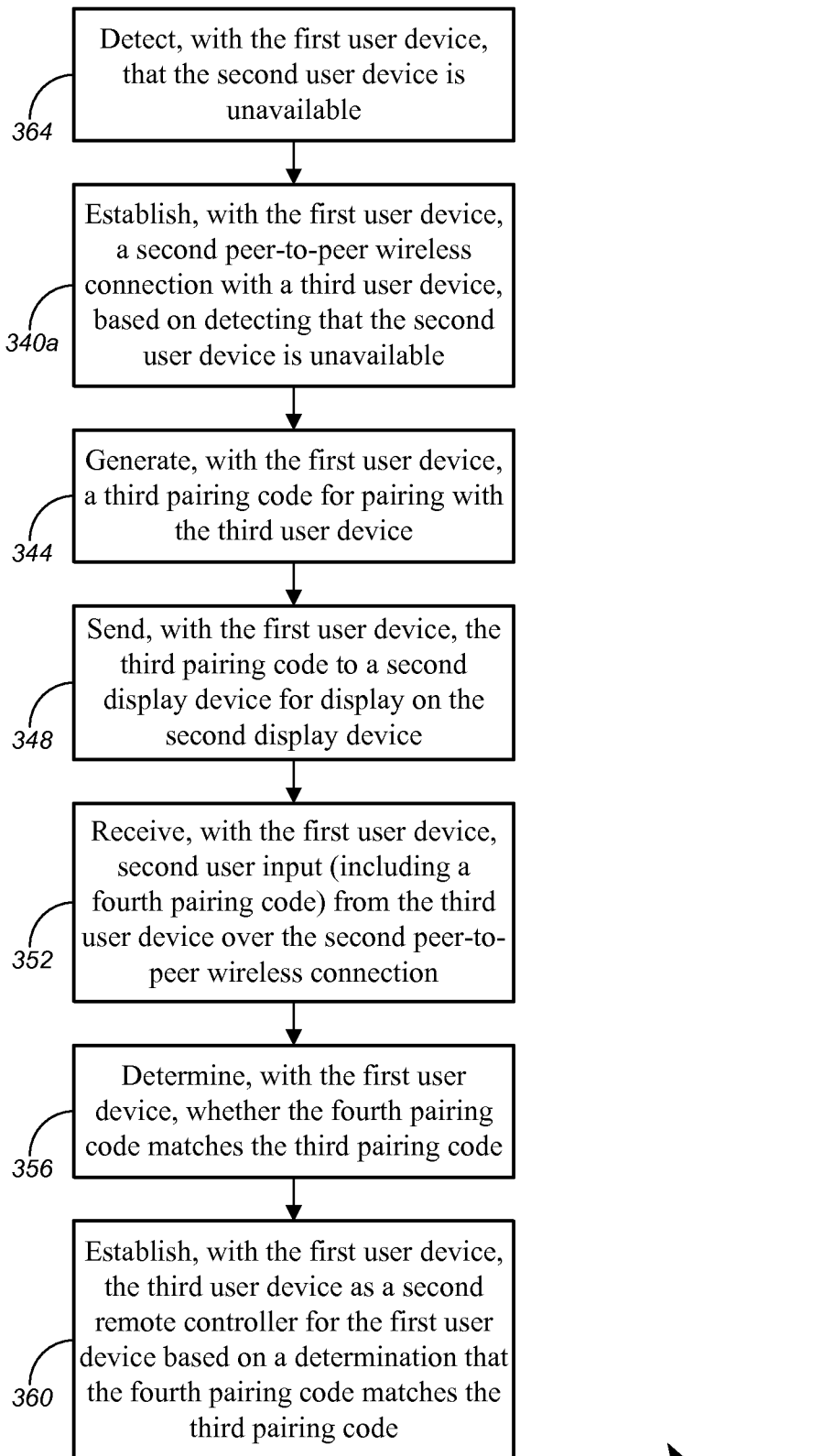
Figure 3D:
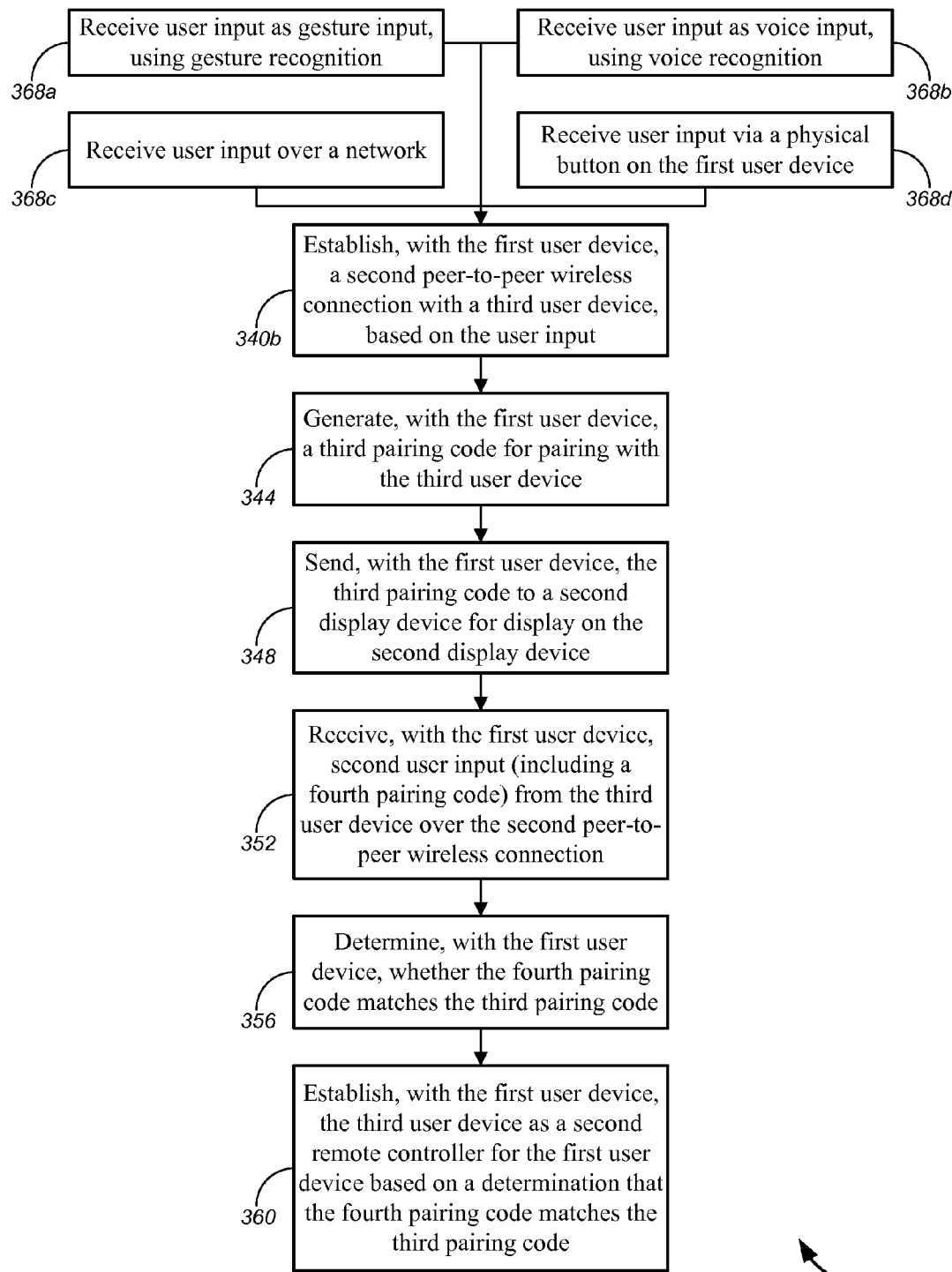
Figure 3E:
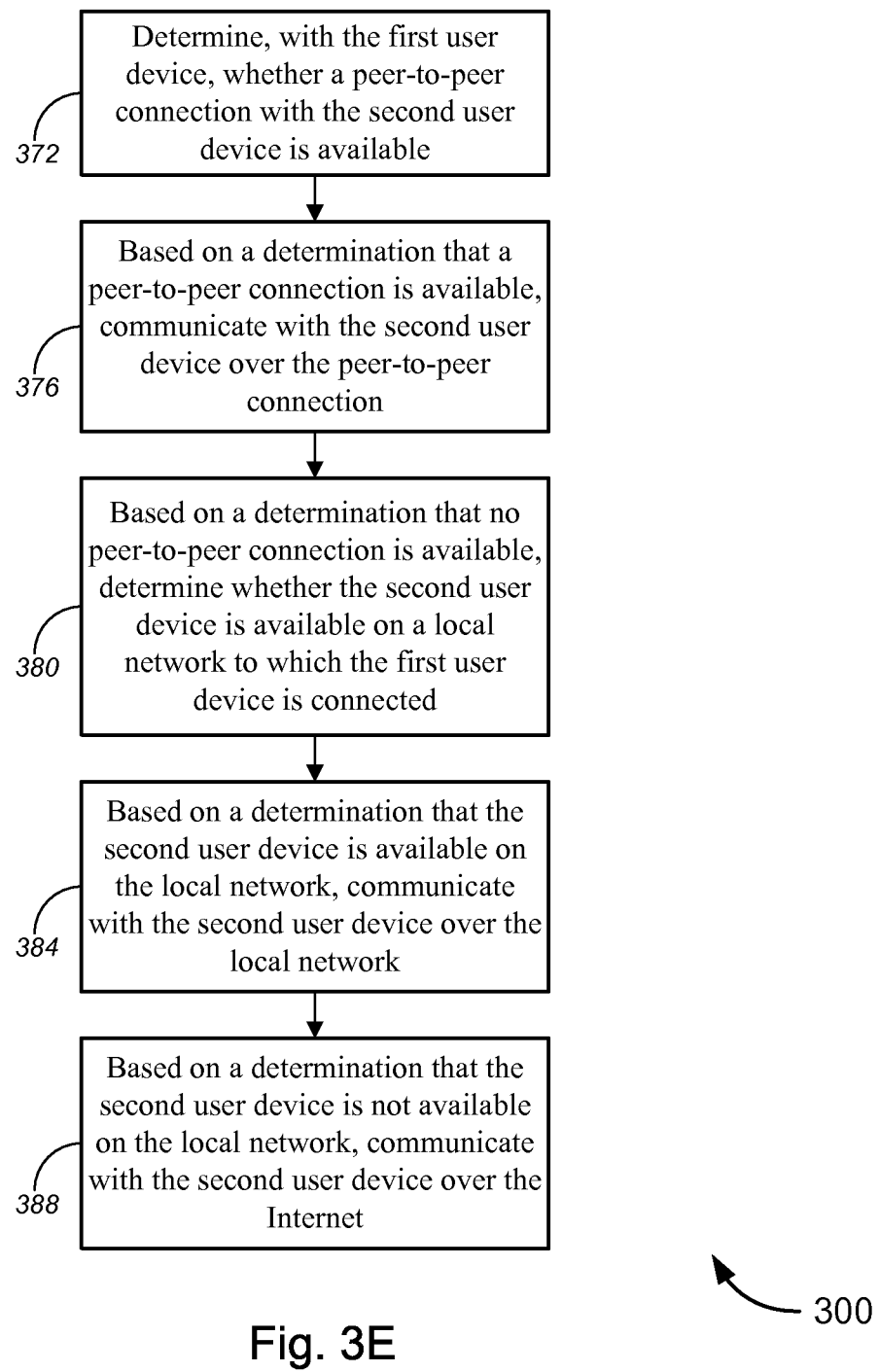
Figure 4:
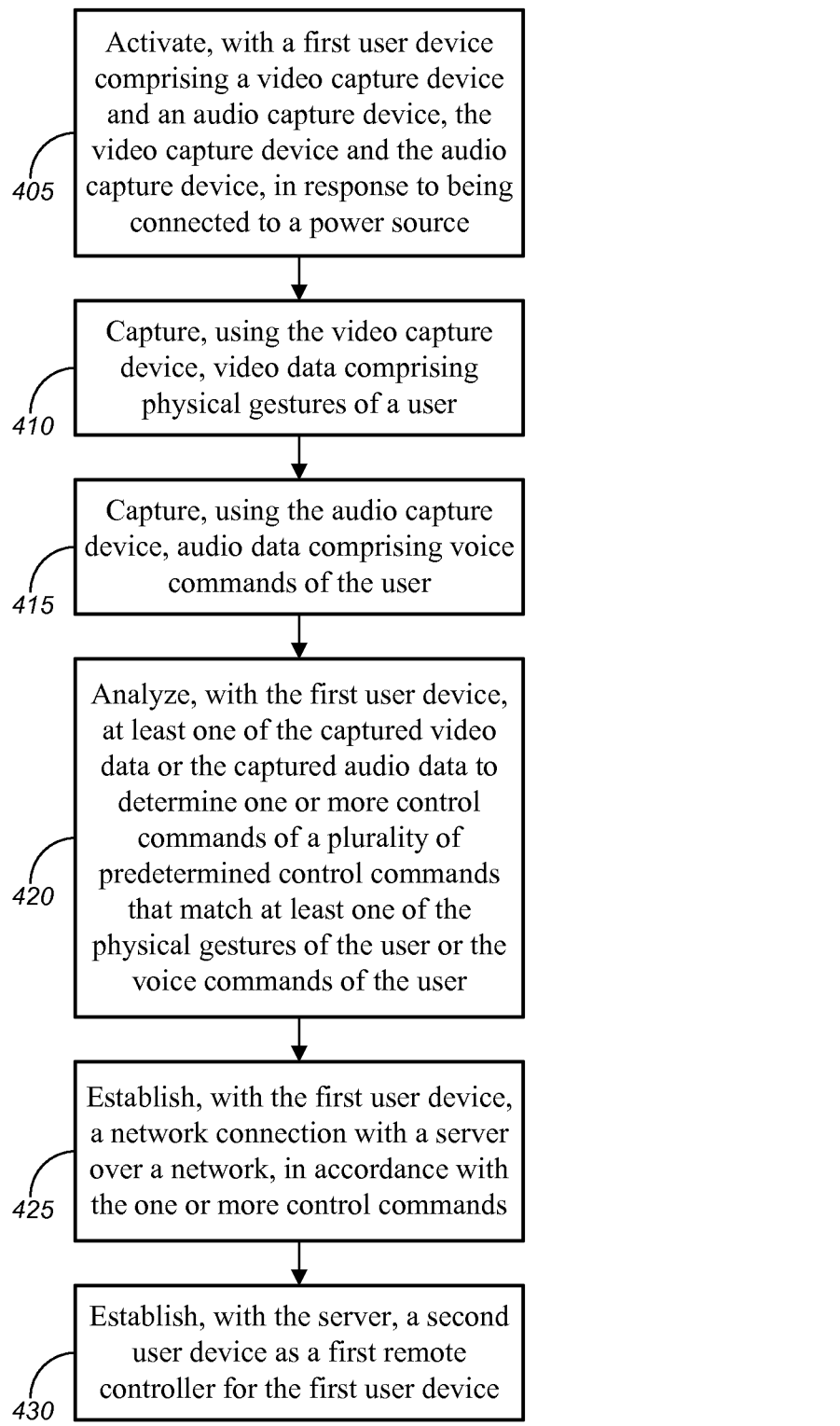
FIG. 4 is a process flow diagram illustrating another method of providing virtual remote control functionality, in accordance with various embodiments.

FIGS. 3A-3E and 4 illustrate various methods for providing virtual remote control functionality. In particular, FIGS. 3A-3E (collectively, "FIG. 3") are process flow diagrams illustrating various methods 300 of providing virtual remote control functionality, in accordance with various embodiments. FIG. 4 is a process flow diagram illustrating another method 400 of providing virtual remote control functionality, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 3 and/or FIG. 4 can be implemented by (and, in some cases, are described below with respect to) the system 100 of FIG. 1 (or components thereof) or system 200 of FIG. 2 (or components thereof), such methods may also be implemented using any suitable hardware implementation. Similarly, while the system 100 of FIG. 1 (and/or components thereof) or system 200 of FIG. 2 (and/or components thereof) can operate according to any of the methods illustrated by FIG. 3 and/or FIG. 4 (e.g., by executing instructions embodied on a computer readable medium), the system 100 and/or system 200 can also operate according to other modes of operation and/or perform other suitable procedures.

Turning to FIG. 3A, the method 300 might comprise broadcasting, with a first user device, a notification that a peer-to-peer wireless connection may be established with the first user device (block 304), and establishing, with the first user device, a first peer-to-peer wireless connection with a second user device (block 308). According to some embodiments, broadcasting the notification may be performed continuously (i.e., all the time). In alternative embodiments, broadcasting the notification may be performed (only) in response to receiving a probe message sent or broadcast by the second user device (in which the probe message might request for the first user device (and all other similar devices) in the area to identify itself (or themselves). The probe-message-based broadcasting of the notification may be useful when trying to save power and/or to avoid creating or contributing to unnecessary data traffic congestion or the like. In yet other embodiments, the notification may be broadcast in response to receiving the probe message from the second user device, and may also be broadcast on a periodic (i.e., non-continuous) basis and/or in response to other commands directly sent to the first user device to broadcast the notification. In some cases, the notification might comprise information regarding the first user device, including, without limitation, at least one of a user-selected name for the first user device, a default name for the first user device, a model name for the first user device, a model number for the first user device, a serial number of the first user device, and/or the like. In some embodiments, establishing the first peer-to-peer wireless connection with the second user device might comprise the second user device receiving the broadcasted notification, the second user device sending a request to establish peer-to-peer wireless connection with the first user device (after receiving the broadcasted notification), the first user device receiving the request from the second user device, and the first user device establishing the first peer-to-peer wireless connection with the second user device based on the received request. In some instances, the second user device might receive the broadcasted notification from the first user device by first searching for nearby broadcasts or broadcasted notifications. In some embodiments, the first user device might host the peer-to-peer wireless connection.

Herein, the first user device might correspond to first user device 105a (as shown in, and described above with respect to, FIGS. 1 and 2) or any suitable user device to be controlled, while the second user device might correspond to second user device 105b (as also shown in, and described above with respect to, FIGS. 1 and 2) or any suitable user device configured to control the first user device. The first peer-to-peer wireless connection might include, without limitation, any one or combination of an Ethernet network connection, a local area network ("LAN") connection, a wide area network ("WAN") connection, a wireless wide area network ("WWAN") connection, a virtual private network ("VPN") connection, an intranet connection, an extranet connection, the Internet connection, a public switched telephone network ("PSTN") connection, an infrared network connection, or a radio frequency ("rf") network connection, and/or the like.

Method 300 might comprise, at block 312, generating, with the first user device, a first pairing code for pairing with the second user device, and, at block 316, sending, with the first user device, the first pairing code to a first display device for display on the first display device. In some instances, the first display device might be external to, and communicatively coupled with, the first user device, and might include, without limitation, an external monitor, a television (e.g., a cable television ("TV"), a high-definition ("HD") TV, an Internet Protocol ("IP") TV, a satellite TV, and/or the like), and/or any other suitable external display device. Alternatively, the first display device might be part of (or otherwise incorporated in) the first user device, and might include, but is not limited to, an integrated display device, an integrated touchscreen device, a removable display device (including touchscreen display and/or non-touchscreen display), and/or the like.

At block 320, method 300 might comprise receiving, with the first user device, first user input (including a second pairing code) from the second user device over the first peer-to-peer wireless connection. Method 300 might further comprise determining, with the first user device, whether the second pairing code matches the first pairing code (block 324), and establishing, with the first user device, the second user device as a first remote controller for the first user device based on a determination that the second pairing code matches the first pairing code (block 328). In some embodiments, method 300 might also comprise, at block 332, establishing, with the second user device, a network connection between the first user device and a network (which might include, without limitation, network 125 in FIGS. 1 and 2, and/or network 610 in FIG. 6). At block 336, method 300 might comprise receiving, with the first user device, remote control instructions from the second user device over the network connection.

With reference to FIGS. 3B-3D, method 300 includes processes for pairing other user devices and establishing these other user devices as remote controllers or remote control devices for the first user device. In this manner, the first user device may be configured to have two to any number of remote control devices (as illustrated by second through $N^{th}$ user devices 105b-105n, 630b-630n in FIGS. 1, 2, and 6).

In FIG. 3B, method 300, at block 340, might comprise establishing, with the first user device, a second peer-to-peer wireless connection with a third user device. In some embodiments, establishing the second peer-to-peer wireless connection with the third user device might comprise the third user device receiving a broadcasted notification (e.g., from block 304), the third user device sending a request to establish peer-to-peer wireless connection with the first user device (after receiving the broadcasted notification), the first user device receiving the request from the third user device, and the first user device establishing the second peer-to-peer wireless connection with the third user device based on the received request. In some instances, the third user device might receive the broadcasted notification from the first user device by first searching for nearby broadcasts or broadcasted notifications. Method 300 might further comprise generating, with the first user device, a third pairing code for pairing with the third user device (block 344), and sending, with the first user device, the third pairing code to a second display device for display on the second display device (block 348). Here, the second display device might be similar, if not identical, to the first display device, and the third user device might be similar, if not identical, to the second user device. The second peer-to-peer wireless connection, like the first peer-to-peer wireless connection, might include, but is not limited to, any one or combination of an Ethernet network connection, a local area network ("LAN") connection, a wide area network ("WAN") connection, a wireless wide area network ("WWAN") connection, a virtual private network ("VPN") connection, an intranet connection, an extranet connection, the Internet connection, a public switched telephone network ("PSTN") connection, an infra-red network connection, or a radio frequency ("rf") network connection, and/or the like.

At block 352, method 300 might comprise receiving, with the first user device and from the third user device over the second peer-to-peer wireless connection, second user input including a fourth pairing code. Method 300, at block 356, might comprise determining, with the first user device, whether the fourth pairing code matches the third pairing code, and, at block 360, establishing, with the first user device, the third user device as a second remote controller for the first user device based on a determination that the fourth pairing code matches the third pairing code.

With reference to FIG. 3C, method 300 might alternatively comprise detecting, with the first user device, that the second user device is unavailable (block 364), and establishing the second peer-to-peer wireless connection based on detecting that the second user device is unavailable (block 340a). In such cases, blocks 344 through 360 might be repeated.

Turning to FIG. 3D, method 300 might, in another set of alternative embodiments, comprise receiving user input, the user input instructing the first user device to initiate pairing (block 368). In some embodiments, receiving user input might comprise one or more of receiving user input as gesture input, using gesture recognition (block 368a), receiving user input as voice input, using voice recognition (block 368b), receiving user input over a network (block 368c), and/or receiving user via a physical button on the first user device (block 368d). According to some embodiments, receiving user input might further comprise one or more of receiving camera input or image-captured input of codes (including, but not limited to, a PIN, a numeric combination, an alphanumeric combination, a plain text code, an image-based pairing code, a binary code, a hexadecimal code, a bar code, a matrix bar code, or a QR code, or the like) (not shown) or receiving non-verbal audio input (which might be audio input that is within normal auditory range of hearing of a human or that is outside the normal auditory range of hearing of a human) generated by a second or third user device based on user input or commands (not shown). In some embodiments, receiving user input might comprise, in response to displaying a first image-based pairing code (take for example, an image of a car or other object, a person, an animal, a building or other structure, or the like), providing the user of the second or third user device to (a) draw an image that is similar to the displayed first image-based pairing code, (b) select an exact copy of the first image-based pairing code from among two or more image-based pairing codes (the exact copy of the image-based pairing code (in some cases, along with the other image-based pairing codes) being obtained from a common source as the original and displayed first image-based pairing code), (c) select a type of image-based pairing code from among two or more types of image-based pairing code, which might have generic images of cars, other objects, humans, animals, buildings, other structures, etc. that are not identical with the displayed first image-based pairing code, or the like. For non-identical image-based pairing codes, determining whether they match may include determining whether differences in the images are within a predetermined threshold. If so, then they match; if not, then they do not match. In some cases, the images may be compared after one of the image-based pairing codes has been normalized to be similar in orientation, size, etc. with the other image-based pairing code (e.g., by functions including, but not limited to, rotation, zooming in, zooming out, tilting, panning, etc.). In some instances, determining whether the image-based pairing codes match comprises converting each image-based pairing code into a frequency domain spectrum or signal (e.g., by performing Fourier analysis or the like) and comparing the resultant frequency domain spectra or signals, within predetermined difference thresholds. At block 340b, method 300 might comprise establishing the second peer-to-peer wireless connection based on the user input. In such instances, blocks 344 through 360 might be repeated.

In FIG. 3E, after establishing connection with the second user device (or any other of the third through $N^{th}$ user devices), if the connection is lost, method 300 includes processes for reestablishing the connection. At block 372, method 300 might comprise determining, with the first user device, whether a peer-to-peer connection with the second user device is available. Based on a determination that a peer-to-peer connection is available, method 300 might comprise communicating with the second user device over the peer-to-peer connection (block 376). Based on a determination that no peer-to-peer connection is available, method 300 might comprise determining whether the second user device is available on a local network to which the first user device is connected (block 380). Method 300, at block 384, might comprise communicating with the second user device over the local network, based on a determination that the second user device is available on the local network. At block 388, method 300 might comprise, based on a determination that the second user device is not available on the local network, communicating with the second user device over the Internet.

Turning to FIG. 4, which is a process flow diagram illustrating another method 400 of providing virtual remote control functionality, in accordance with various embodiments, method 400 might comprise, at block 405, activating, with a first user device comprising a video capture device and an audio capture device, the video capture device and the audio capture device, in response to being connected to a power source. Method 400 might further comprise capturing, using the video capture device, video data comprising physical gestures of a user (or other visual commands as described above with respect to FIG. 3D) (block 410), and capturing, using the audio capture device, audio data comprising voice commands of the user (or other audio commands as described above with respect to FIG. 3D) (block 415). At block 420, method 400 might comprise analyzing, with the first user device, at least one of the captured video data or the captured audio data to determine one or more control commands of a plurality of predetermined control commands that match at least one of the physical gestures of the user (or other visual commands) or the voice commands of the user (or other audio commands). The one or more control commands might comprise control commands to establish a network connection with a server over a network. The method 400, at block 425, might comprise establishing, with the first user device, the network connection with the server over the network, in accordance with the one or more control commands. Method 400 might further comprise establishing, with the server, a second user device as a first remote controller for the first user device (block 430), which may not have or may not require a dedicated remote control device.

Figure 5:
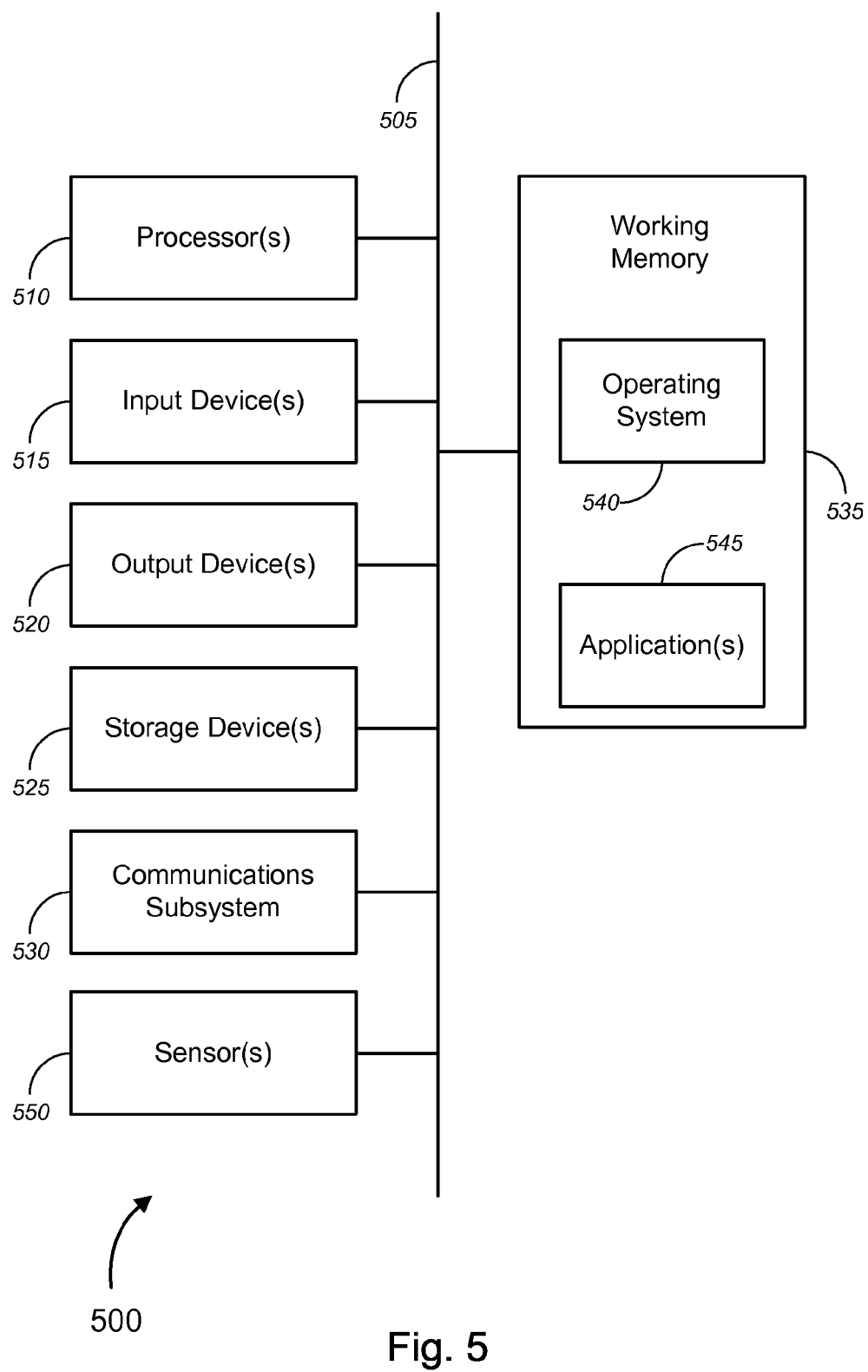
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as a first user device (i.e., device to be controlled), second through $N^{th}$ user devices (i.e., remote controller devices), control server, web server, and/or the like. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include, without limitation, a mouse, a keyboard, a keypad, a touchscreen display, one or more buttons, one or more switches, and/or the like; and one or more output devices 520, which can include without limitation a display device, a touchscreen display, a printer, one or more light emitting devices, an audio speaker, and/or the like.

The computer system 500 may further include (and/or be in communication with) one or more storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

According to some embodiments, system 500 might further comprise one or more sensors 550, which might include, without limitation, one or more cameras, one or more IR sensors, one or more audio sensors, and/or one or more 3D sensors, or the like. In some cases, the one or more sensors 550 might be incorporated in (or might otherwise be one of) the input device(s) 515. The output device(s) 520 might, in some embodiments, further include one or more monitors, one or more TVs, and/or one or more display screens, or the like.

The terms "machine readable medium" and "computer readable medium," as used herein, refer to any medium that participates in providing data that causes a machine to operate in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire, and fiber optics, including the wires that comprise the bus 505, as well as the various components of the communication subsystem 530 (and/or the media by which the communications subsystem 530 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
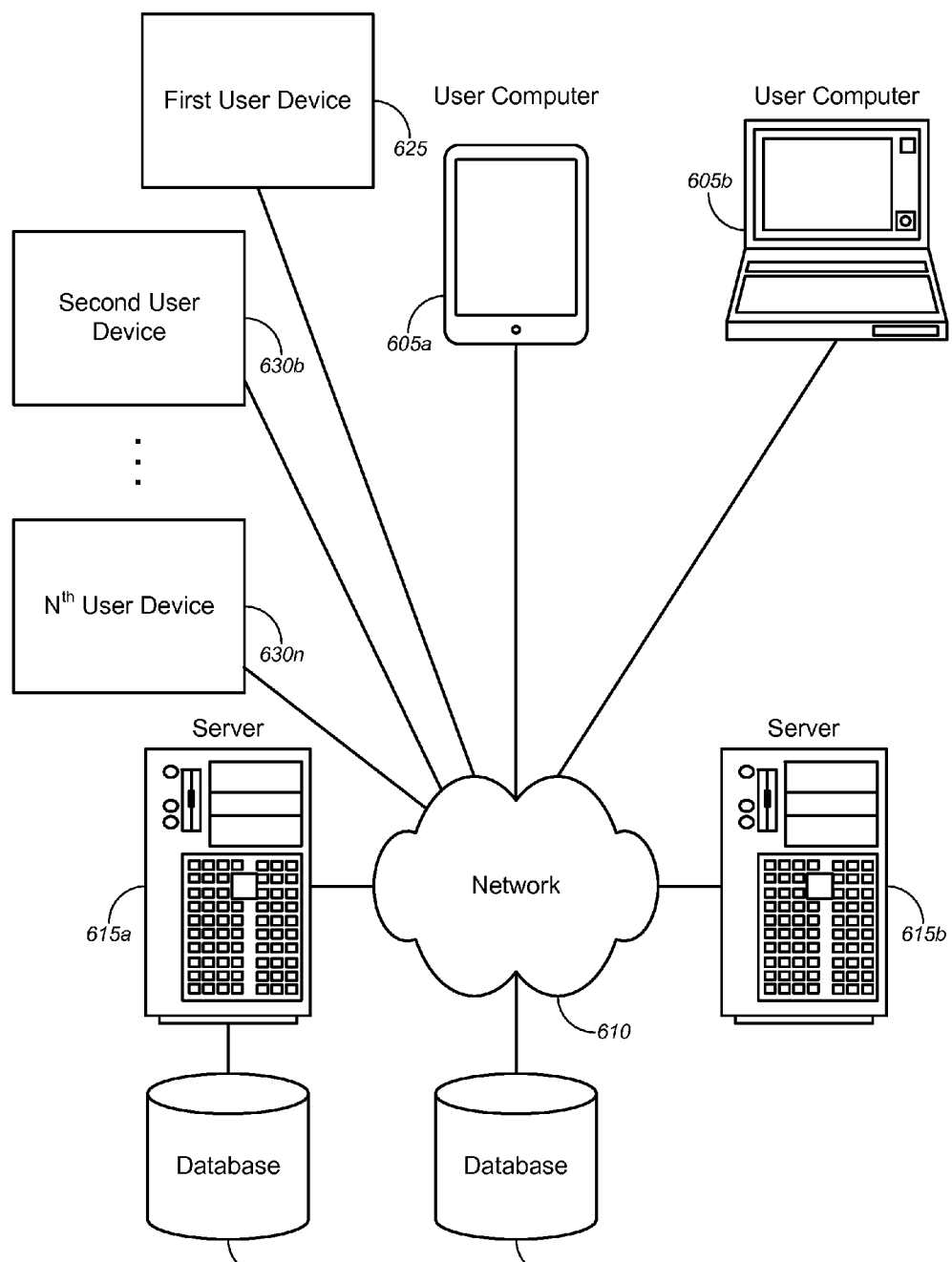
FIG. 6 is a block diagram illustrating a networked system of computers, which can be used in accordance with various embodiments.

As noted above, a set of embodiments comprises systems that provide virtual remote control of consumer electronics devices that, in some cases, do not have or do not require dedicated remote controllers. FIG. 6 illustrates a schematic diagram of a system 600 that can be used in accordance with one set of embodiments. The system 600 can include one or more user computers 605. In particular, a user computer 605 can be a first user device (i.e., device to be controlled), second through $N^{th}$ user devices (i.e., remote controller devices), as described above. More generally, a user computer 605 can be a general purpose personal computer (including, merely by way of example, desktop computers, workstations, tablet computers, laptop computers, handheld computers, mobile phones, smart phones, and/or the like), running any appropriate operating system, several of which are available from vendors such as Apple, Microsoft Corp., as well as a variety of commercially-available UNIX™ or UNIX-like operating systems. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or of displaying and navigating web pages or other types of electronic documents. Although the exemplary system 600 is shown with two user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including, without limitation, TCP/IP, SNA™, IPX™, AppleTalk™, and/or the like. Merely by way of example, the network 610 can include a local area network ("LAN"), including, without limitation, a fiber network, an Ethernet network, a Token-Ring™ network, and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

Embodiments can also include one or more server computers 615. Each of the server computers 615 may be configured with an operating system, including, without limitation, any of those discussed above with respect to the user computers 605, as well as any commercially (or freely) available server operating systems. Each of the servers 615 may also be running one or more applications, which can be configured to provide services to one or more clients 605 and/or other servers 615.

Merely by way of example, one of the servers 615 might be a control server, with the functionality described above. In another embodiment, one of the servers might be a web server, which can be used, merely by way of example, to provide communication between a user computer 605 and a control server, for example, to process requests for web pages or other electronic documents from user computers 605 and/or to provide user input to the control server. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform operations in accordance with methods provided by various embodiments.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™, or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as providing a user interface for a control server, as described above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters. Further, as noted above, the functionality of one or more servers 615 might be implemented by one or more containers or virtual machines operating in a cloud environment and/or a distributed, cloud-like environment based on shared resources of a plurality of user devices.

In certain embodiments, the system can include one or more data stores 620. The nature and location of the data stores 620 is discretionary: merely by way of example, one data store 620 might comprise a database 620a that stores information about master accounts, assigned user devices, etc. Alternatively and/or additionally, a data store 620b might be a cloud storage environment for storing uploaded images and/or video. As the skilled reader can appreciate, the database 620a and the cloud storage environment 620b might be collocated and/or separate from one another. Some or all of the data stores 620 might reside on a storage medium local to (and/or resident in) a server 615a. Conversely, any of the data stores 620 (and especially the cloud storage environment 620b) might be remote from any or all of the computers 605, 615, so long as it can be in communication (e.g., via the network 610) with one or more of these. In a particular set of embodiments, a database 620a can reside in a storage-area network ("SAN") familiar to those skilled in the art, and/or the cloud storage environment 620b might comprise one or more SANs. (Likewise, any necessary files for performing the functions attributed to the computers 605, 615 can be stored locally on the respective computer and/or remotely, as appropriate.) In one set of embodiments, the database 620a can be a relational database, such as an Oracle database, that is adapted to store, update, and retrieve data in response to SQL-formatted commands. The database might be controlled and/or maintained by a database server, as described above, for example.

As noted above, the system can also include a first user device 625 (i.e., device to be controlled), a second through $N^{th}$ user devices 630b-630n (i.e., remote controller devices). The first user device 625 might correspond to any of first user device 105a and/or user computer 605. The second through $N^{th}$ user devices 630b-630n might correspond to any of second through $N^{th}$ user devices 105b-105n and/or user computer 605. Using the techniques described herein, the first user device 625 might establish a peer-to-peer wireless connection with one or more of the second through $N^{th}$ user devices 630b-630n, and might (through various alternative or complementary processes) establish each of the one or more of the second through $N^{th}$ user devices 630b-630n as remote controllers or remote control devices for the first user device 625. In some cases, select ones of the one or more of the second through $N^{th}$ user devices 630b-630n might establish a network connection between the first user device 625 and a network (e.g., network 610), and might allow the select ones of the one or more of the second through $N^{th}$ user devices 630b-630n to send remote control instructions to the first user device over the network connection. In some cases, the methods described above with respect to FIG. 3 might be applied to the user devices 625 and 630.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
broadcasting, with a first user device, a notification indicating that a peer-to-peer wireless connection may be established with the first user device;
determining, with the first user device, whether a peer-to-peer connection with a second user device is available;
establishing, with the first user device, a first peer-to-peer wireless connection with the second user device and communicating with the second user device over the first peer-to-peer wireless connection, based on a determination that the peer-to-peer connection is available and on a request to establish peer-to-peer wireless connection received from the second user device, the request being sent by the second user device after the second user device receives the broadcasted notification;
based on a determination that no peer-to-peer connection is available, determining whether the second user device is available on a local network to which the first user device is connected;
based on a determination that the second user device is available on the local network, communicating with the second user device over the local network; and
based on a determination that the second user device is not available on the local network, communicating with the second user device over the Internet;
generating, with the first user device, a first pairing code for pairing with the second user device;
sending, with the first user device, the first pairing code to a first display device for display on the first display device;
receiving, with the first user device and from the second user device, first user input including a second pairing code;
determining, with the first user device, whether the second pairing code matches the first pairing code;
establishing, with the first user device, the second user device as a first remote controller for the first user device based on a determination that the second pairing code matches the first pairing code.

2. The method of claim 1, further comprising:
establishing, with the second user device, a network connection between the first user device and a network; and
receiving, with the first user device, remote control instructions from the second user device over the network connection.

3. The method of claim 2, wherein the network is at least one of an Ethernet network, a local area network ("LAN"), a wide area network ("WAN"), a wireless wide area network ("WWAN"), a virtual private network ("VPN"), an intranet, an extranet, the Internet, a public switched telephone network ("PSTN"), an infra-red network, or a radio frequency ("rf") network.

4. The method of claim 2, wherein receiving, with the first user device, remote control instructions from the second user device over the network connection comprises receiving, with the first user device, remote control instructions from the second user device via a user interface of a webpage.

5. The method of claim 1, wherein the first user device is one of a video communication device, a video calling device, an image capture device, a presence detection device, a video recording device, a video playback device, an audio recording device, an audio playback device, a tablet computer, a laptop computer, a desktop computer, a toy vehicle, a toy aircraft, a drone, or a consumer electronic device sold without a dedicated remote controller.

6. The method of claim 1, wherein the first user device is a gaming console.

7. The method of claim 1, wherein the second user device is one of a smart phone, a mobile phone, a tablet computer, a desktop computer, a laptop computer, a portable gaming device, or a remote control device.

8. The method of claim 1, further comprising:
establishing, with the first user device, a second peer-to-peer wireless connection with a third user device;
generating, with the first user device, a third pairing code for pairing with the third user device;
sending, with the first user device, the third pairing code to a second display device for display on the second display device;
receiving, with the first user device and from the third user device over the second peer-to-peer wireless connection, second user input including a fourth pairing code;
determining, with the first user device, whether the fourth pairing code matches the third pairing code;
establishing, with the first user device, the third user device as a second remote controller for the first user device based on a determination that the fourth pairing code matches the third pairing code.

9. The method of claim 8, further comprising:
detecting, with the first user device, that the second user device is unavailable;
wherein establishing, with the first user device, a second peer-to-peer wireless connection with a third user device comprises establishing the second peer-to-peer wireless connection based on detecting that the second user device is unavailable.

10. The method of claim 8, further comprising:
receiving user input, the user input instructing the first user device to initiate pairing;
wherein establishing, with the first user device, a second peer-to-peer wireless connection with a third user device comprises establishing the second peer-to-peer wireless connection based on the user input.

11. The method of claim 10, wherein the user input is received over a network.

12. The method of claim 10, wherein the user input is received via a physical button on the first user device.

13. The method of claim 8, wherein the first display device and the second display device are the same display device.

14. The method of claim 1, wherein the first display device is external to, and communicatively coupled with, the first user device.

15. The method of claim 1, wherein the first pairing code is at least one of a personal identification number ("PIN"), a numeric combination, an alphanumeric combination, a plain text code, an image-based pairing code, a binary code, a hexadecimal code, a bar code, a matrix bar code, or a quick response ("QR") code, and wherein the second pairing code is at least one of a personal identification number ("PIN"), a numeric combination, an alphanumeric combination, a plain text code, an image-based pairing code, a binary code, or a hexadecimal code.

16. The method of claim 15, wherein the second user device comprises a camera that is used to capture an image of the first pairing code that is displayed on the first display device, wherein the second pairing code comprises the image-captured first pairing code.

17. The method of claim 15, wherein the image-based pairing code of the second pairing code and the image-based pairing code of the first pairing code may be determined to match even if they differ, so long as the difference is within a predetermined threshold.

18. The method of claim 1, wherein the first peer-to-peer wireless connection is one of a Bluetooth connection, a WiFi connection, or a near field communication ("NFC") connection.

19. The method of claim 1, wherein broadcasting the notification indicating that a peer-to-peer wireless connection may be established with the first user device comprises continuously broadcasting, with a first user device, a notification indicating that a peer-to-peer wireless connection may be established with the first user device.

20. The method of claim 1, wherein broadcasting the notification indicating that a peer-to-peer wireless connection may be established with the first user device comprises broadcasting, with a first user device, a notification indicating that a peer-to-peer wireless connection may be established with the first user device, only in response to receiving a probe message from the second user device requesting that the first user device identify itself.

21. The method of claim 1, wherein the notification indicating that a peer-to-peer wireless connection may be established with the first user device comprises information regarding the first user device that comprises at least one of a user-selected name for the first user device, a default name for the first user device, a model name for the first user device, a model number for the first user device, or a serial number of the first user device.

22. The method of claim 1, further comprising:
receiving, with the first user device and from a media content source, media content comprising at least one of image content or video content;
sending, with the first user device, the at least one of image content or video content to the first display device for display on the first display device;
wherein sending the first pairing code to the first display device for display on the first display device comprises:
combining, with the first user device, the at least one of image content or video content with the first pairing code into a combined content, such that the first pairing code is superimposed over a portion of the at least one of image content or video content, when both are simultaneously displayed on the first display device;
sending, with the first user device, the combined content for display on the first display device.

23. A first user device, comprising:
at least one processor;
a video output interface to provide video output to a first display device;
a peer-to-peer communication interface device;
a storage medium in communication with the at least one processor, the storage medium having encoded thereon a set of instructions executable by the at least one processor to control operation of the first user device, the set of instructions comprising:
instructions to broadcast a notification indicating that a peer-to-peer wireless connection may be established with the first user device via the peer-to-peer communication interface device;
instructions to determine whether a peer-to-peer wireless connection with a second user device is available;
instructions to establish the peer-to-peer wireless connection with the second user device and to communicate with the second user device over the first peer-to-peer wireless connection, based on a determination that the first peer-to-peer wireless connection is available and on a request to establish peer-to-peer wireless connection received from the second user device, the request being sent by the second user device after the second user device receives the broadcasted notification;
instructions to determine whether the second user device is available on a local network to which the first user device is connected, based on a determination that no peer-to-peer wireless connection is available;
instructions to communicate with the second user device over the local network, based on a determination that the second user device is available on the local network; and
instructions to communicate with the second user device over the Internet, based on a determination that the second user device is not available on the local network;
instructions to generate a first pairing code for pairing with the second user device;
instructions to send the first pairing code to the first display device for display on the first display device;
instructions to receive first user input including a second pairing code from the second user device;

instructions to determine whether the second pairing code matches the first pairing code; and instructions to establish the second user device as a first remote controller for the first user device based on a determination that the second pairing code matches the first pairing code.

24. The device of claim 23, further comprising:
a network interface device,
wherein the set of instructions further comprises:
   instructions to establish a network connection, via the network interface device, between the first user device and a network;
   instructions to receive remote control instructions from the second user device over the network connection.

25. The device of claim 24, wherein the network is at least one of an Ethernet network, a local area network ("LAN"), a wide area network ("WAN"), a wireless wide area network ("WWAN"), a virtual private network ("VPN"), an intranet, an extranet, the Internet, a public switched telephone network ("PSTN"), an infra-red network, or a radio frequency ("rf") network.

26. The device of claim 24, wherein the instructions to receive remote control instructions from the second user device over the network connection comprise instructions to receive remote control instructions from the second user device via a user interface of a webpage.

27. The device of claim 23, wherein the first user device is one of a video communication device, a video calling device, an image capture device, a presence detection device, a video recording device, a video playback device, an audio recording device, an audio playback device, a tablet computer, a laptop computer, a desktop computer, a toy vehicle, a toy aircraft, a drone, or a consumer electronic device sold without a dedicated remote controller.

28. The device of claim 23, wherein the first user device is a gaming console.

29. The device of claim 23, wherein the second user device is one of a smart phone, a mobile phone, a tablet computer, a desktop computer, a laptop computer, a portable gaming device, or a remote control device.

30. The device of claim 23, wherein the set of instructions further comprises:
   instructions to establish a second peer-to-peer wireless connection with a third user device via the peer-to-peer communication interface device;
   instructions to generate a third pairing code for pairing with the third user device;
   instructions to send the third pairing code to the second display device for display on the second display device;
   instructions to receive second user input including a fourth pairing code from the third user device over the second peer-to-peer wireless connection;
   instructions to determine whether the fourth pairing code matches the third pairing code;
   instructions to establish the third user device as a second remote controller for the first user device based on a determination that the fourth pairing code matches the third pairing code.

31. The device of claim 23, wherein the first pairing code is at least one of a personal identification number ("PIN"), a numeric combination, an alphanumeric combination, a plain text code, an image-based pairing code, a binary code, a hexadecimal code, a bar code, a matrix bar code, or a quick response ("QR") code, and wherein the second pairing code is at least one of a personal identification number ("PIN"), a numeric combination, an alphanumeric combination, a plain text code, an image-based pairing code, a binary code, or a hexadecimal code.

32. The device of claim 23, wherein the first peer-to-peer wireless connection is one of a Bluetooth connection, a WiFi connection, or a near field communication ("NFC") connection.

33. The device of claim 23, further comprising:
a video capture device; and
an audio capture device,
wherein the set of instructions further comprises:
   instructions to capture, using the video capture device, video data comprising physical gestures of a user;
   instructions to capture, using the audio capture device, audio data comprising voice commands of the user;
   instructions to analyze at least one of the captured video data or the captured audio data to determine one or more control commands of a plurality of predetermined control commands that matches at least one of the physical gestures of the user or the voice commands of the user; and
   instructions to control operation of the first user device in accordance with the one or more control commands.

34. The device of claim 33, wherein the one or more control commands comprise one or more of control commands for controlling the first user device to establish the first peer-to-peer wireless connection with the second user device, control commands for controlling the first user device to establish the second user device as a first remote controller for the first user device based on a determination that the second pairing code matches the first pairing code, or control commands for causing the first user device to actuate built-in functionalities.

35. A method, comprising:
   activating, with a first user device comprising a video capture device and an audio capture device, the video capture device and the audio capture device, in response to being connected to a power source;
   capturing, using the video capture device, video data comprising physical gestures of a user;
   capturing, using the audio capture device, audio data comprising voice commands of the user;
   analyzing, with the first user device, at least one of the captured video data or the captured audio data to determine one or more control commands of a plurality of predetermined control commands that match at least one of the physical gestures of the user or the voice commands of the user, wherein the one or more control commands comprises control commands to establish a network connection with a server over a network and control commands to establish a second user device as a remote controller for the first user device;
   establishing, with the first user device, the network connection with the server over the network, in accordance with the one or more control commands that comprise at least one of gesture commands or voice commands;
   establishing, with the server, the second user device as a first remote controller for the first user device, based at least in part on the one or more control commands that comprise at least one of gesture commands or voice commands;
   determining, with the first user device, whether a peer-to-peer connection with a second user device is available;

based on a determination that the peer-to-peer connection is available, communicating with the second user device over the peer-to-peer connection;

based on a determination that no peer-to-peer connection is available, determining whether the second user device is available on a local network to which the first user device is connected;

based on a determination that the second user device is available on the local network, communicating with the second user device over the local network; and based on a determination that the second user device is not available on the local network, communicating with the second user device over the Internet.

\* \* \* \* \*